US012512887B2

(12) United States Patent
Ionescu et al.

(10) Patent No.: US 12,512,887 B2
(45) Date of Patent: Dec. 30, 2025

(54) BEAMFORMING CODEBOOK MANAGEMENT AND BEAMFORMING CONTROL IN A WIRELESS NETWORK

(71) Applicant: Charter Communications Operating, LLC, St. Louis, MO (US)

(72) Inventors: Dumitru M. Ionescu, Poway, CA (US); Samer Henry, Grand Island, NY (US)

(73) Assignee: Charter Communications Operating, LLC, St. Louis, MO (US)

( * ) Notice: Subject to any disclaimer, the term of this patent is extended or adjusted under 35 U.S.C. 154(b) by 129 days.

(21) Appl. No.: 18/141,406

(22) Filed: Apr. 29, 2023

(65) Prior Publication Data
US 2023/0353206 A1    Nov. 2, 2023

Related U.S. Application Data

(60) Provisional application No. 63/397,742, filed on Aug. 12, 2022, provisional application No. 63/336,934, filed on Apr. 29, 2022.

(51) Int. Cl.
*H04B 7/06* (2006.01)

(52) U.S. Cl.
CPC ......... *H04B 7/0617* (2013.01); *H04B 7/0634* (2013.01); *H04B 7/06952* (2023.05)

(58) Field of Classification Search
CPC ............... H04B 7/0617; H04B 7/0634; H04B 7/06952; H04B 7/0626
See application file for complete search history.

(56) References Cited

U.S. PATENT DOCUMENTS

| 11,147,069 | B1 | 10/2021 | Chopra et al. | |
| 2012/0087426 | A1* | 4/2012 | Zhang | H04B 7/066 375/260 |

(Continued)

OTHER PUBLICATIONS

Invitation to pay additional fees and, where applicable, protest fees. Annex to Form PCT/ISA/206, Communication Relating to the Results of the Partial International Search, PCT/US2023/020506, Jul. 31, 2023, pp. 1-11.

(Continued)

*Primary Examiner* — Sung S Ahn
(74) *Attorney, Agent, or Firm* — Armis IP Law, LLC

(57) ABSTRACT

A wireless base station, via a first wireless beam in a beamforming codebook, transmits communications to multiple communication devices. In one implementation, the wireless base station receives respective channel matrix information from each of the multiple communication devices. The channel matrix information indicates weight coefficients applied to respective receiver antenna hardware to receive the communications. Alternatively, when reciprocity holds, the wireless base station can be configured to generate the channel matrix information based on observation of receiving communications from the one or more communication devices. Via the channel matrix information, a communication management resource associated with the wireless base station adjusts beamforming settings of the first wireless beam to best support communications with the communication devices over the first wireless beam. The communication management resource dynamically updates the beamforming codebook such that a corresponding wireless beam is angularly adjusted towards a centroid of the communication devices.

30 Claims, 18 Drawing Sheets

(56) References Cited

U.S. PATENT DOCUMENTS

| | | | | |
|---|---|---|---|---|
| 2013/0315328 | A1* | 11/2013 | Liu | H04B 7/046 375/267 |
| 2017/0244451 | A1* | 8/2017 | Raghavan | H04L 7/04 |
| 2019/0199410 | A1* | 6/2019 | Zhao | H04B 7/0413 |
| 2021/0184744 | A1* | 6/2021 | Pezeshki | H04L 5/0023 |

OTHER PUBLICATIONS

Choi, Junil, et al., "Advanced Limited Feedback Designs for FD-MIMO Using Uniform Planar Arrays", 2015 IEEE Global Communications Conference (GLOBECOM), 2015, pp. 1-6, DOI: 10.1109/GLOCOM.2015.7417281.

Forest, Florent, et al., "A Survey and Implementation of Performance Metrics for Self-Organized Maps", arXiv preprint, arXiv. 2011.05847v1 [cs.NE] Nov. 11, 2020, pp. 1-9.

Lippmann, Richard P. "An Introduction to Computing with Neural Nets", IEEE ASSP Magazine, vol. 4, Apr. 1, 1987, pp. 4-22.

Monzingo, R.A., et al., Introduction to Adaptive Arrays, Bagley G., Ed .; John Wiley, Chichester 1980. The Aeronautical Journal (1981), 85(847), 349-349. doi:10.10177/S0001924000030086.

R1-2205094, Charter Communications, "Discussion on Codebook Enhancement with AI/ML," 3GPP TSG RAN1#109-e, Electronic Meeting, May 9-20, 2022, pp. 1-5.

RI-150381, Samsung, "Discussion on FD-MIMO Codebook Enhancements", 3GPP TSG RAN WG1 Meeting #80, Feb. 9-13, 2015, pp. 1-5.

RP-213599, "New SI: Study on Artificial Intelligence (AI)/Machine Learning (ML) for NR Air Interface", 3GPP TSG RAN Meeting #94e, Electronic Meeting, Dec. 6-17, 2021, pp. 1-6.

* cited by examiner

BEAMFORMING CODEBOOK MANAGEMENT AND BEAMFORMING CONTROL IN A WIRELESS NETWORK

RELATED APPLICATION

This application claims the benefit of earlier filed U.S. Patent Application Ser. No. 63/336,934 entitled "CODEBOOK MANAGEMENT AND BEAMFORMING CONTROL IN A WIRELESS NETWORK," filed on Apr. 29, 2022, the entire teachings of which are incorporated herein by this reference.

This application claims the benefit of earlier filed U.S. Patent Application Ser. No. 63/397,742 entitled "CODEBOOK MANAGEMENT AND BEAMFORMING CONTROL IN A WIRELESS NETWORK," filed on Aug. 12, 2022, the entire teachings of which are incorporated herein by this reference.

BACKGROUND

Mobile operators use beamforming codebook to manage wireless beams. Beamforming is a signal processing technique that allows for directional transmission or reception of data in a wireless communication network. Due to the directionality of signal, it helps mitigate interference, improve signal-to-interference-noise-ratio (SINR) and increase coverage capacity in a wireless network environment.

BRIEF DESCRIPTION OF EMBODIMENTS

Techniques herein are useful over conventional techniques. For example, embodiments herein include unique ways of providing efficient use of wireless services via beamforming and dynamically updating one or more beamforming codebooks. Each set of beamforming settings in the codebook supports communications with a respective cluster of one or more communication devices. The beamforming settings for each cluster of communication devices in the codebook is updated over time based on changing angles of the communication devices receiving wireless communications from a wireless station. Alternatively, the beamforming settings for each cluster of communication devices in the codebook is updated over time based on changing angles of the wireless station receiving wireless communications from the communication devices.

More specifically, a communication management resource as discussed herein receives first input indicating angular directions associated with different wireless paths between a first wireless station and multiple communication devices. The communication management resource derives first beamforming settings from the first input. The first beamforming settings support wireless communications between the first wireless station and the multiple communication devices. The communication management resource implements the first beamforming settings to provide wireless connectivity between the first wireless station and the multiple communication devices.

In one example, the first input is feedback received from the multiple communication devices monitoring reception of first wireless signals transmitted from the first wireless station. The angular directions of the first input capture (indicate) different angles of the communication devices receiving the first wireless signals transmitted from the first wireless station.

Yet further, in an example, the first input can be generated based on the first wireless station monitoring reception of wireless signals transmitted from the multiple communication devices over the different wireless paths to the first wireless station, the angular directions indicating different angles of the first wireless station receiving the wireless signals.

In accordance with yet further examples, the received input is channel matrix information indicating weight coefficients applied to respective antenna elements in transmitter antenna hardware of the multiple communication devices. The channel matrix information captures corresponding angles of the communication devices receiving the wireless communications transmitted from the first wireless station.

Still further examples herein include a communication management resource producing a beamforming codebook to include the first beamforming settings for a respective cluster of communication devices. The communication management resource, first wireless station, or other suitable entity communicates the beamforming code book and the first beamforming settings to the communication devices for implementation by the multiple communication devices to receive communications from the first wireless station.

In accordance with further examples, the communication management resource receives the first input as: i) first channel matrix information associated with a first portion of the different wireless paths between the first wireless station and a first communication device of the multiple communication devices, and ii) second channel matrix information associated with a second portion of the different wireless paths between the first wireless station and a second communication device of the multiple communication devices.

Yet further, the first input may include first channel matrix information associated with a first portion of the different wireless paths between a first wireless station and a first communication device of the multiple communication devices; the first input may further include second channel matrix information associated with a second portion of the different wireless paths between the first wireless station and a second communication device of the multiple communication devices. From the first channel matrix information, the communication management resource derives a first wireless beam angle supporting first wireless connectivity between the first wireless station and the first communication device; from the second channel matrix information, the communication management resource derives a second wireless beam angle supporting second wireless connectivity between the first wireless station and the first communication device; and the communication management resource then derives a third beam angle based on the first wireless beam angle and the second wireless the beam angle.

Implementing the first beamforming settings to provide wireless connectivity between the first wireless station and the multiple communication devices includes: in accordance with the first beamforming settings, transmitting wireless signals at the third wireless beam angle from the first wireless station to communicate with the first communication device and the second communication device.

Yet further examples herein include establishing pairings of the first wireless station with each of the multiple communication devices. During a beamforming sweep test, the first wireless station transmits first wireless signals over the different wireless paths. The communication management resource receives the first input as feedback from the multiple communication devices. The feedback may include any suitable information such as wireless power level values indicating power levels at which the multiple communication devices receive the first wireless signals.

In accordance with still further examples, derivation of the first beamforming settings may include: deriving a first wireless beam angle based on a first communication device receiving wireless communications from the wireless station over a first portion of the different wireless paths; deriving a second wireless beam angle based on a second communication device receiving the wireless communications from the wireless station over a second portion of the different wireless paths; and via quantizing, deriving a third beam angle based on the first wireless beam angle and the second wireless the beam angle.

Still further, the communication management resource can be configured to establish pairings of the first wireless station with each of the multiple communication devices. During a beamforming sweep test, the first wireless station transmits first wireless signals over the different wireless paths from the first wireless station. The communication management resource receives the first input as feedback from the multiple communication devices. The feedback includes wireless power level values indicating power levels at which the multiple communication devices receive the first wireless signals. The power level information provides an indication of how well a respective wireless path between the first wireless station and a corresponding communication device supports robust conveyance of communications.

As further discussed herein, generation of the beamforming settings from the first input may include the communication management resource adjusting phase settings associated with the first beamforming settings based on a change in reception angles at the communication devices. The adjusted phase settings are assigned to control phases of antenna elements in a multi-dimensional array disposed in the first wireless station.

Yet further examples as discussed herein include the communication management resource, in response to communicating first wireless signals from the first wireless station: i) receiving first channel matrix information from a first communication device of the multiple communication devices, the first channel matrix information indicating angular antenna settings of the first mobile communication device receiving the first wireless signals during channel estimation by the first communication device, and ii) receiving second channel matrix information from a second communication device of the multiple communication devices, the second channel matrix information indicating angular antenna settings of the second communication device receiving the first wireless signals during channel estimation by the second communication device.

In a still further example, implementation of the first beamforming settings includes: communicating the first beamforming settings in a beamforming codebook from the first wireless station to each of the multiple communication devices. The first beamforming settings implemented by the communication devices enable the communication devices to receive subsequent communications from the first wireless station.

These and further examples are discussed herein.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communication management. The instructions, when executed by computer processor hardware, cause the computer processor hardware (such as one or more co-located or disparately processor devices or hardware) to: receive first input indicating angular directions associated with different wireless paths between a first wireless station and multiple communication devices; derive first beamforming settings from the first input, the first beamforming settings supporting wireless communications between the first wireless station and the multiple communication devices; and implement the first beamforming settings to provide wireless connectivity between the first wireless station and the multiple communication devices.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
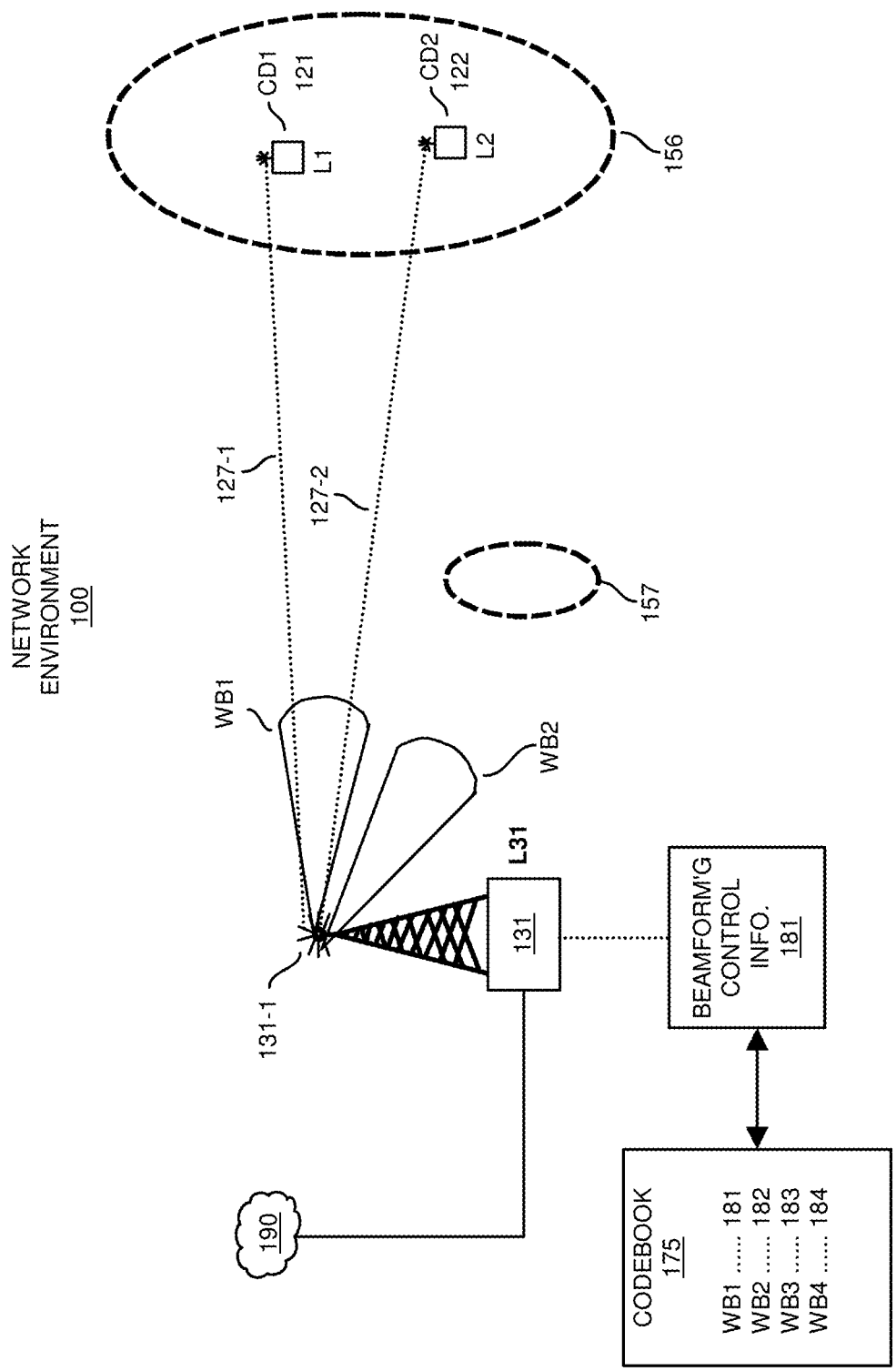
FIG. 1 is an example diagram illustrating a communication network environment and a wireless base station in communication with multiple communication devices as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system includes a wireless station (such as gNode B, wireless base station, etc.) supporting beamforming. Communication devices also supporting beamforming for transmitting or receiving wireless signals. The wireless base station transmits communications from a wireless base station to multiple communication devices. In one implementation, the wireless base station receives respective channel matrix information (such as angle information) from each of the multiple communication devices. The channel matrix information indicates weight coefficients applied to respective receiver antenna hardware to receive the communications in a particular angular direction. The channel matrix information and corresponding weight coefficients associated with multiple communication devices indicates angles from which the respective communication devices receives respective wireless signals from the wireless base station. Alternatively, when reciprocity holds, the wireless base station generates channel matrix information itself based on observations of receiving communications from the one or more communication devices.

Via the received or generated reception angle information, a communication management resource associated with the wireless base station adjusts beamforming settings associated with a respective cluster of communication devices to best support communications with the communication devices over one or more wireless beams.

Codebook Enhancements

For antenna arrays, it is well-known that the direction ($\theta$, $\varphi$) of a propagation path in 3-D space (w.r.t. spherical coordinates) is related to a $N_r \times N_t$ spatial channel matrix H by means of the array response vector(s) $a_t(\cdot,\cdot) \in \mathbb{C}^{N_t \times 1}$ and $a_r(\cdot,\cdot) \in \mathbb{C}^{N_r \times 1}$; here $N_r$, $N_t$ are the number of receive and transmit antennas respectively—in the general case arranged as planar antenna arrays (2-D antenna arrays allow beamforming direction with respect to both azimuth and elevation angles). The array response vector on the transmit side is $$a_t(\theta^t,\varphi^t) = g_t(\theta^t,\varphi^t)[\exp(jd_1^T k(\theta^t,\varphi^t)) \ldots \exp(jd_{N_t}^T k(\theta^t,\varphi^t))]^T$$

and similarly, at the receive side; di denote the vector of positions of the antenna elements in the respective arrays, $$k(\theta, \varphi) = \frac{2\pi}{\lambda}\hat{r} = \frac{2\pi}{\lambda}[\sin\theta\cos\varphi \ \sin\theta\sin\varphi \ \cos\varphi]^T$$

is the wave vector. The directionality angles will receive an additional subscript l that will refer to a path in the angular domain. $g(\theta, \varphi)$ is the complex valued pattern of the antenna elements (assumed common among elements). Single-polarized antennas will be assumed below, for simplicity.

The goal is to establish a connection between the array response vectors and the eigenvectors of the correlation matrix at the transmit 1side $$R_{HH}=E\{H^H H\}$$

Spatial Channel Matrix Vs. Array Response Vectors

For the case with one receive antenna and L angular paths, the channel matrix is a row vector, denoted $h^T \in \mathbb{C}^{1 \times N_t}$, given by $$h^T = \sum_{l=0}^{L-1} \lambda_l a_t^T(\theta_l^t, \varphi_l^t)$$

The paths are modelled above in the angular domain; $\lambda_l \in \mathbb{C}$ models the complex gain along the l-th angular path due to interaction with scatterers in the propagation medium; it is possible to link the coefficients of h to multipath delays, but that is not immediately relevant to this discussion. Regardless of orthogonality assumptions, the optimum beamforming weights are proportional to $$w^{oT} = \sum_{l=0}^{L-1} \lambda_l^* a_t^H(\theta_l^t, \varphi_l^t),$$

which highlights the fact that the array response vectors play a key role.

Obviously, the addition of antennas at the receiver side will build a receiver-side (2-D) antenna array and cause the formation of an array response vector $a_r(\theta^r, \varphi^r)$ (gain pattern $g_r(\theta^r, \varphi^r)$ is of course included with the array response vector); it will also 'build' new rows into the spatial channel matrix, and thereby model the spatial filtering on the receive side, at arrival angles $\theta_l^r, \varphi_l^r$, one pair for each of the L angular paths departing from the transmitter. The spatial MIMO matrix H will be, clearly, expressed as $$H = \sum_{l=0}^{L-1} \lambda_l a_r(\theta_l^r, \varphi_l^r) a_t^T(\theta_l^t, \varphi_l^t)$$

Autocorrelation Matrix Vs. Array Response Vectors

In the tradition set by the NR specifications, the gNB and the UE need not know each other's spatial filtering (precoding vectors). For the purpose of coping with precoding on the transmitter side, one would like to remove the influence of $a_r(\theta_l^r, \varphi_l^r)$, l=0, ..., L-1. This can be achieved by relying on the transmit side correlation matrix since:

$$R_t = \Sigma_i p_{t,i} a_t(\theta_i^t, \varphi_i^t) a_t^H(\theta_i^t, \varphi_i^t)$$

where $p_{t,i}$ is proportional with $\|a_r(\theta_i^r, \varphi_i^r)\|^2$ and magnitude of channel coefficient. More importantly, this does not depend on the subcarrier index, which makes the transmit side autocorrelation a large-scale parameter.

By inspection (cf., e.g., expansion of SVD in terms of the singular values and outer products of left and right singular vectors) this can be written as $$R_t = A_t P_t A_t^H$$

One can now recognize that if the columns of $A_t$ are at least approximately orthogonal, the Hermitian becomes an inverse and $R_t$ is an eigenvalue decomposition, whereby good approximations to $A_t$ can be found efficiently via eigenvalue decomposition. Such approximation does become better and better as the number of antennas increases.

One can assume, based on established state of the art, that the orthogonality approximation holds quite well, especially so for large number of antennas, Without a formal, self-contained proof—but rather an outline—it is worth pointing out that $A_t$ has size $N_t$—which, when the transmit antenna array is 2-D (uniform rectangular array), would equal the product of the number of antenna rows respectively columns. It has been shown i that (in one aspect) a channel with a dominant angular path (specifically, rank one) can be expressed as a Kronecker product between two 'DFT-like' vectors that can decouple azimuth from elevation and can serve as a basis for DFT-based precoding codebooks. A related result from conventional techniques concludes that such a Kronecker product is an eigenvector of the channel correlation matrix.

Basis for Codebook Enhancement

While DFT codebooks (in the form of Kronecker product of two 1-D DFT codebooks) are attractive and have proven useful, they start to fail when the angular spread of the channel increases; in essence, this is due to the fact that summing many array response vectors (see above MIMO channel expansion) is less well approximated by a DFT vector. One remedy is to resort to SVD methods.

Codebook Enhancement and Quantization Via Self-Organizing-Maps (SOM)

One observation is that the SVD precoding vectors can be obtained as (normalized) eigenvectors of the transmit side correlation matrix—which, in turn, are directly linked to beam directionality on the transmit-side. This can be alternatively understood from the viewpoint of an angular representation of the MIMO spatial channel on the transmitter side—namely, on a 2D map based on resolvable transmit-side beamwidths with respect to the elevation and azimuth angles; resolvability is, of course, understood as a function of the vertical and horizontal (normalized) apertures of the 2D transmit antenna array.

The qualitative correspondence between the higher dimensional beamforming vectors (from $\mathbb{C}^{N_t \times 1}$), on one hand, and the 2D 'manifold' map on another hand, can be intuitively grasped via the well-known fact that the codebook for a 2D transmit antenna array is the Kronecker product between two codebooks that are functions (within the angular domain representation of the MIMO channel) of the elevation and respectively azimuth directions of spatially resolvable beams. The question of how can such a dimensionality reduction be meaningfully achieved is answered below, via self-organizing-maps (SOMs), aka Kohonen feature maps, which are a type of stochastic clustering algorithms. Like the stochastic gradient descent (SGD) algorithm, it lends itself to batch implementation and to adding momentum (in order to increase speed). The Kohonen method is a type of Artificial Neural Network (ANN) which follows an unsupervised learning approach and trained its network using a competitive learning algorithm. It is used for clustering and mapping (or dimensionality reduction) techniques in order to map multidimensional data onto lower-dimensional maps. The preservation of neighbourhood topology relations between input space and the map is an important performance (cost) parameter that can be measured; it is desired to preserve the topological proximity in the higher dimensional space while mapping to the lower-dimension map—thus enabling a vector-quantization-like behaviour. During training, the 2D map is 'shaped' so as to essentially follow the probability mass of the inputs, and to eventually inherit the sparsity of the MIMO channel in the angular domain. Notably, the dimensionality of the input data points is not lost (despite of moving to the 2D map), in the sense that the 'weights'—being updated by the algorithm and residing at the nodes of the SOM—preserve the dimensionality of the input data points (the recent beamforming vectors used for training the SOM). Eventually, with respect to a short-term 'beamforming horizon' a dynamic codebook will emerge that can dynamically replace fixed codebooks, e.g. traditional DFT-based codebooks.

The first step is to randomize the weight vectors individually associated with (stored in) the nodes of the 2D map, then randomly pick an input vector, followed by computing a metric (Euclidean distance) to each of the map nodes. The minimum among the Euclidean distances is then used to find the similarity between the current input vector and the winning map node. Then, the winning node is tracked (this node is the best matching unit). Then weight vectors of the nodes in a neighbourhood of the best matching unit are updated—in effect, pulling them closer to the input vector. This is repeated until convergence (training completed). The distinguishing feature from SGD is the notion pf modulating the learning rate by a neighbourhood scaling factor (somewhat similar to SGD with momentum).

As discussed herein, a dynamic non-fixed codebook can be (in essence) enabled in at least two ways: the gNB either infers the DL channel matrix at the gNB (during UL transmissions, while channel reciprocity holds) based on, e.g., CSI-RS, or has it fed back by the UE when it can not (e.g., FDD). In either case, the transmit side correlation matrix (or a singular vector itself) could be computed/estimated by the gNB, or the side information can be fed back from the UE (e.g., via a digital feedback channel).

Quantization Methodology

In contrast to conventional techniques, an evolving codebook over time as discussed herein adapts to varying channel conditions and differs from a conventional DFT based codebook in that it's based on a historic realization which is quantized. The codebook as discussed herein provides quantized finite set that represents beamforming vectors. These beamforming vectors are grouped as centroids and then communicated to all UEs (a.k.a., communication devices CD) within the vicinity of transmission. The goal is to create a dataset that should be used to form an image like concept that allows similar quantization as in image processing. Using the Kohonen algorithm, convergence occurs with regular beam sweeping over traditional static codebooks. The gnodeB can observe reference signal vectors from collection of UE signals on the uplink and estimates channel from these reference signals depending on the subcarriers. The gnodeB then knows the downlink channel due to transpositions with the uplink channels as a result of TDD.

In one example, every successful beam selection generates a dataset. The dataset is a collection of many possible BF vectors from a collection of UEs in the recent past. Over time, UEs will have not moved substantially since the channel was observed and therefore transposed because of time-division duplex. In order for the beam forming weight vector to be realized, it needs M weights (one for each Tx antenna). That translates to an elevation and azimuth angle to achieve that direction in the angular domain.

Now, more specifically, with reference to the drawings, FIG. 1 is an example diagram illustrating a communication network environment and, via common beamforming settings, control of one or more wireless beams to communicate with multiple communication devices in a network environment as discussed herein.

In this example, the codebook 175 (a.k.a., beamforming codebook information) includes beamforming control information 181 to support multiple different wireless beams WB1, WB2, WB3, etc., to a respective cluster 156 of communication devices. Beamforming control information 181 indicates antenna settings of antenna hardware 131-1 (a multiple-dimensional array or matrix of antenna elements) associated with the wireless station 131 to steer the respective wireless beams including wireless beams WB1, WB2, WB3, etc., in respective desired directions to one or more communication devices CD1, CD2, etc., in cluster 156. The beamforming control information for each wireless beam can be configured to indicate different angular directions (such as defined by azimuth angle and elevation angle, etc.) of transmitting the wireless beams from the wireless station 131 and/or angles associated with beamforming at the communication devices to receive wireless signals from the wireless station 131.

Each wireless beam in the beamforming control information supports wireless connectivity to a corresponding cluster of communication devices. For example, the beamforming control information 181 indicates a first angular direction (vector) in which to transmit a corresponding wireless beam WB1 from the wireless station 131 to the cluster of communication devices 156; the beamforming control information 182 indicates a corresponding second angular direction (vector) in which to transmit a corresponding wireless beam WB2 from the wireless station 131 to the cluster of communication devices 157; and so on.

Note that each of the entities, components, functions, etc., as discussed herein can be configured as hardware, software, or a combination of hardware and software. For example, the communication management resource 140 can be configured as communication management hardware, communication management software, of a combination of communication management function and communication management software; the wireless station 131 can be configured as wireless station hardware, wireless station software, or a combination of wireless station hardware and wireless station software; communication device 121 can be configured as communication device hardware, communication device software, or a combination of communication device hardware and communication device software; communication device 122 can be configured as communication device hardware, communication device software, or a combination of communication device hardware and communication device software; wireless station 131 can be configured as wireless station hardware, wireless station software, or a combination of wireless station hardware and wireless station software; and so on.

Figure 2:
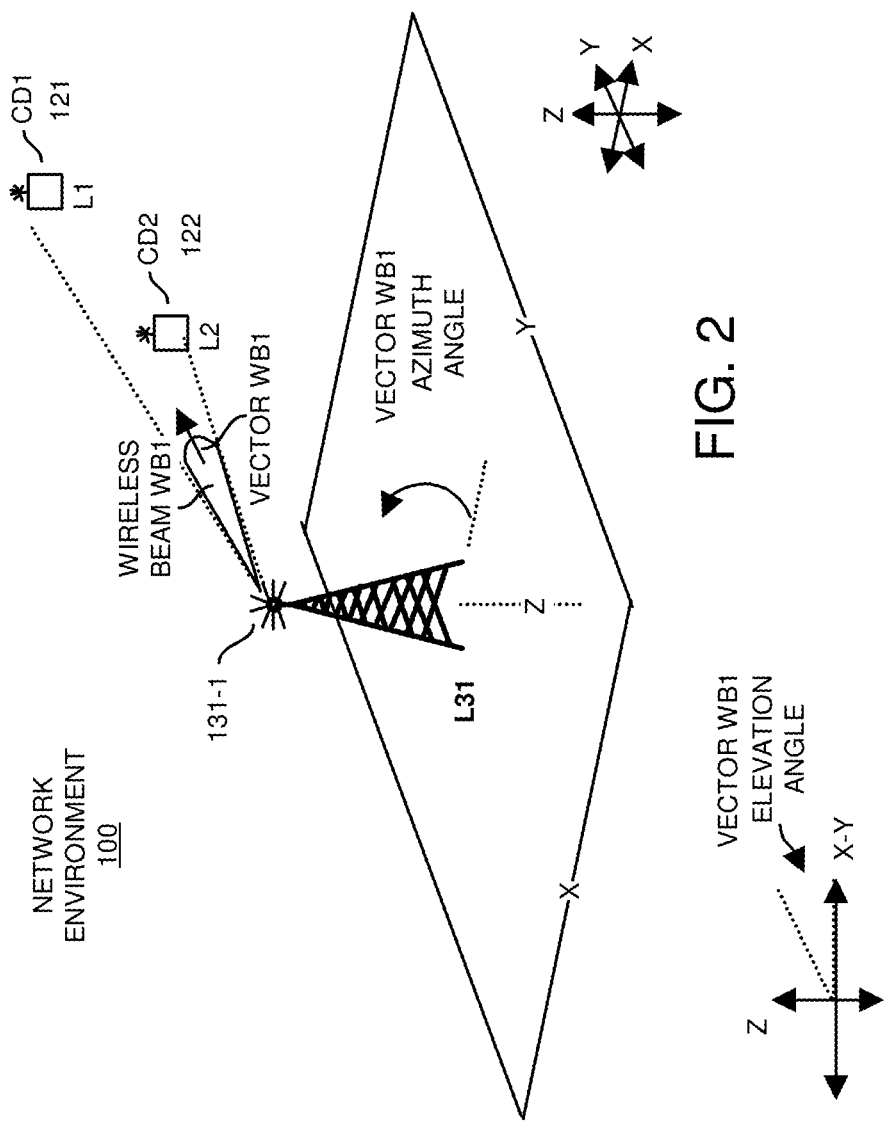
FIG. 2 is an example diagram illustrating wireless beamforming control of communication devices in one or more dimensions as discussed herein.

FIG. 2 is an example diagram illustrating wireless beamforming and control of same in 3 dimensions as discussed herein.

Each of the wireless stations (such as wireless station 131, communication device CD1, communication device CD2, etc.) in the network environment 100 can be configured to angularly transmit at one or more different angles (such as azimuth angle radially outward from the z-axis, elevation angle such as with respect to X-Y plane, etc.) to communicate with one or more target wireless stations. The angular direction associated with WB1 includes an azimuth angle and elevation angle defining a respective direction from which the wireless station 131 and corresponding antenna hardware 131-1 transmit the corresponding wireless beam WB1 to the cluster of communication devices including communication device CD 1, CD 2, etc.

A respective wireless beam transmitted from the wireless station 131 and corresponding antenna hardware 131-1 may be received by multiple communication devices in a respective cluster. In such an instance, the beamforming settings for the respective wireless beam support wireless connectivity with multiple communication devices, reducing a number of different beamforming settings in a beamforming codebook.

Figure 3:
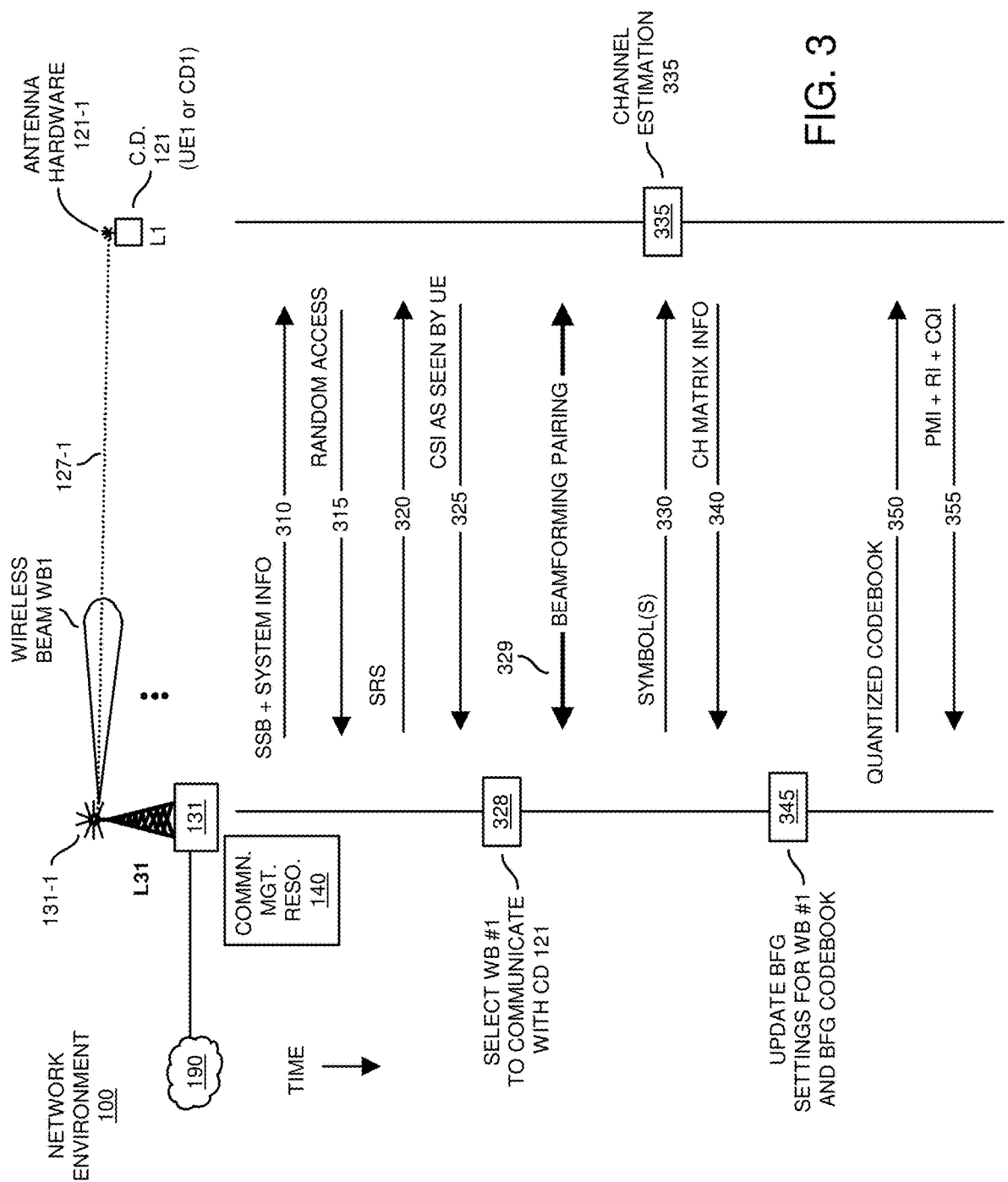
FIG. 3 is an example diagram illustrating reception of angle information from a first mobile communication device and updating of wireless beamforming settings and a corresponding beamforming codebook as discussed herein.

FIG. 3 is an example diagram illustrating collection of channel matrix information (reception angle information) from a first mobile communication device and updating wireless beam settings and a corresponding beamforming codebook as discussed herein.

In this example, the wireless base station (such as gNode B and corresponding communication management resource 140) implements one or more wireless beams including wireless beam WB1 to communicate with multiple communication devices such as communication device CD1, communication device CD2, communication device CD3, etc.

Wireless communication link 127-1 supports wireless connectivity between the wireless base station 131 and the communication device 121.

As shown, the wireless base station 131 transmits wireless communications 310 such as SSB (Synchronization and Signal Block) information (such as a reference signal) and system information to the communication device 121.

Via random access, the communication device 121 transmits wireless communications 315 such as a request to establish a wireless communication link and data session.

The wireless base station 131 transmits wireless communications 320 such as a reference signal to the communication device 121. In one example, the wireless communications 320 include a Sounding Reference Signal (SRS), which is a reference signal transmitted by the wireless base station 131 in the downlink direction. The communication device 121 monitors the communications 320 and determines (estimates) uplink channel quality associated with the wireless communication link 127-1.

The communication device 121 transmits wireless communications 325 such as CSI (Channel State Information) such as indicating a power level or attributes of the downlink communications 320 previously received from the wireless base station 131.

In processing operation 328, during beamforming pairing 329, the wireless base station 131 selects one or more wireless beams such as including wireless beam WB1 to communicate with the communication device 121. The wireless base station 131 and the communication device 121 establish beamforming pairing (such as wireless beam WB1 to a second reception wireless beam at the mobile communication device 121).

Subsequent to pairing and establishing wireless beams, the wireless base station 131 transmits wireless communications 330 such as one or more symbols to the communication device 121.

As further shown, the communication device 121 implements channel estimation function 335 based on the received symbols in communications 330. Via the channel estimation function 335, the communication device 121 generates channel matrix information indicating settings associated with antenna elements of antenna hardware 121-1 receiving the wireless communications 330. In one example, the channel matrix information indicates respective or captures one or more angles of the communication device 121 receiving wireless communications over different wireless paths transmitted by the wireless station 131 and corresponding antenna hardware 131-1. The communication device 121 communicates the channel matrix information associated with receiving one or more wireless beams from the wireless station 131 in communications 340 to the wireless base station 131. As previously discussed, the channel matrix information captures different angles of the communication device 121 receiving different wireless beams from the wireless station 131.

In processing operation 345, the wireless base station 131 uses the received channel matrix information (communications 340) to update beamforming settings 181 for wireless beam WB1. As previously discussed, the channel matrix information (or angle information in communications 340) indicates corresponding receipt of the different wireless beams at the communication device 121. More specifically, the channel matrix information further indicates a respective angle in which the different wireless beams transmitted from the wireless station 131 are received by the communication device 121. As further discussed herein, based upon the different angles from which the communication device 121 receives the different wireless beams from the wireless station 131, the communication management function 345 updates a respective beamforming codebook to include the updated settings 181 (angular directions of controlling antenna elements of antenna hardware 131-1) that control directionality of the one or more wireless beams from the wireless station 131 and/or reception of beamforming at the respective communication device to receive the wireless signals transmitted by the wireless station 131.

Over time, note that the communication device 121 may move throughout the network environment 100; the presence of different obstacles in the network environment 100 may change; and so on. This means that an original set of wireless beamforming settings (on a transmitter or receiver side) may no longer provide good wireless connectivity between the wireless station 131 and the corresponding communication device 121. Based upon continued feedback from the communication device 121 indicating the corresponding different angles of receiving one or more wireless beams, the communication management function 345 updates the beamforming settings associated with the one or more wireless beam supporting communications to the communication device 121. The communication management function 345 also can be configured to update respective beamforming codebook information indicating the updated beamforming settings associated with the communication device. As further discussed herein, the wireless base station 131 tweaks directionality of the wireless beams over time depending on the feedback such as channel matrix information received from the communication device 121, which monitors the received wireless beams and provides the feedback of same to the wireless station 131.

Via communications 350, the wireless base station 131 communicates a codebook 175 of different beamforming settings to the communication device 121 and potentially other communication devices in the network environment 100. The communication devices use the codebook to determine different beamforming settings to receive subsequent wireless communications from the wireless station 131.

Via communications 355, the communication device 121 communicates information such as PMI (Pre-coding Matrix Indicator), RI (Rank Indicator), and CQI (Channel Quality Information) to the wireless base station 131.

Figure 4:
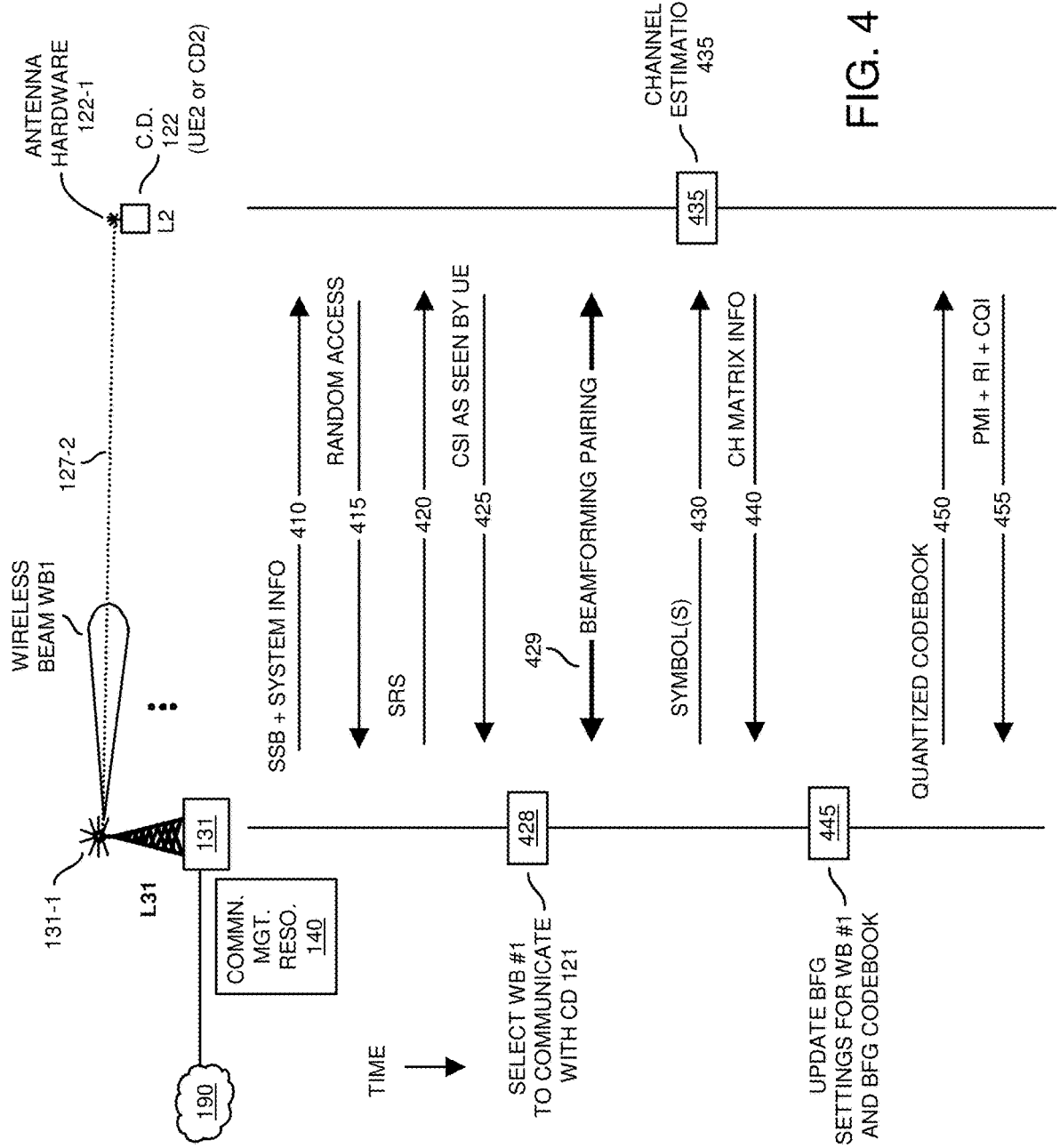
FIG. 4 is an example diagram illustrating reception of angle information from a second mobile communication device and updating of wireless beamforming settings and a corresponding beamforming codebook as discussed herein.

FIG. 4 is an example diagram illustrating collection of channel matrix information from a second mobile communication device and updating wireless beam settings and a corresponding beamforming codebook according to embodiments herein.

In this example, the wireless base station 131 (such as gNode B and corresponding communication management resource 140) implements one or more wireless beams including wireless beam WB1 to communicate with multiple communication devices such as communication device CD1, communication device CD2, communication device CD3, etc.

Wireless communication link 127-2 supports wireless connectivity between the wireless base station 131 and the communication device 122.

As shown, the wireless base station 131 initially transmits wireless communications 410 such as SSB (Synchronization and Signal Block) information (such as a reference signal) and system information to the communication device 122.

Via random access, the communication device 122 transmits wireless communications 415 such as a request to establish a wireless communication link.

The wireless base station 131 transmits wireless communications 420 such as a reference signal to the communication device 122. In one example, the wireless communications 420 include a Sounding Reference Signal (SRS), which is a reference signal transmitted by the wireless base station 131 in the downlink direction. The communication device 122 monitors the communications 420 and determines (estimates) uplink channel quality.

The communication device 122 transmits wireless communications 425 such as CSI (Channel State Information) such as indicating a power level or attributes of the downlink communications 420 received from the wireless base station 131.

In processing operation 428, during beamforming pairing 429, the wireless base station 131 selects one or more wireless beams such as including wireless beam WB1 to communicate with the communication device 122. The wireless base station 131 and the communication device 122 establish beamforming pairing.

Subsequent to pairing via implementation of appropriate beamforming at the wireless station 131 and the communication device 122, the wireless base station 131 transmits wireless communications 430 such as one or more symbols to the communication device 122.

The communication device 122 implements channel estimation function 435 based on the received symbols in communications 430. Via the channel estimation function, the communication device 122 generates channel matrix information indicating settings (such as directionality settings) associated with antenna elements of antenna hardware 121-1 for reception of the wireless communications 430 over one or more different wireless beams transmitted from the wireless base station 131. In one example, the channel matrix information indicates respective one or more angles of the communication device 121 receiving wireless communications over one or more different wireless beams transmitted by the wireless station 131 and corresponding antenna hardware 131-1. The communication device 122 communicates the channel matrix information (reception angle information) associated with receiving one or more wireless beams from the wireless station 131 in communications 440 to the wireless base station 131.

In processing operation 445, the wireless base station 131 uses the received channel matrix information (communications 440) to update beamforming settings 181 for wireless beam WB1 and or other wireless beams supporting wireless connectivity between the wireless station 131 and multiple communication devices 121 and 122. As previously discussed, the channel matrix information can be configured to indicate settings in which to receive the different wireless beams at the communication device 121. The channel matrix information further indicates a respective angle in which the different wireless beams transmitted from the wireless station 131 are received by the communication device 121.

Based upon the different angles from which the communication device 121 receives the different wireless beams from the wireless station 131, the communication management function 445 updates a respective beamforming codebook to include the updated settings 181 (angular directions of controlling antenna elements of antenna hardware 131-1) that control directionality of the one or more wireless beams from the wireless station 131. The beamforming settings notify the communication devices of beamforming settings to receive wireless beams from the wireless station 131.

Over time, the communication device 122 may move throughout the network environment 100; the presence of different obstacles in the network environment 100 may change; and so on. This means that an original set of wireless beamforming settings may no longer provide good wireless connectivity between the wireless station 131 and the corresponding communication device 122. Based upon continued feedback from the communication device 122 indicating the corresponding different angles of receiving one or more wireless beams, the communication management function 445 updates the beamforming settings associated with the one or more wireless beam supporting communications to the communication device 122. The communication management function 445 also can be configured to update respective beamforming codebook information indicating the updated beamforming settings associated with the communication device. The wireless base station 131 tweaks directionality of the wireless beams over time depending on the feedback such as channel matrix information received from the communication device 122, which monitors the received wireless beams and provides the feedback of same to the wireless station 131.

Via communications 450, the wireless base station 131 communicates a beamforming codebook 175 of different beamforming settings to the communication device 122 and potentially other communication devices in the network environment 100. The communication devices use the codebook an indication of different beamforming settings to receive subsequent wireless communications from the wireless station 131.

Via communications 455, the communication device 122 communicates information such as PMI (Pre-coding Matrix Indicator), RI (Rank Indicator), and CQI (Channel Quality Information) to the wireless base station 131.

Figure 5:
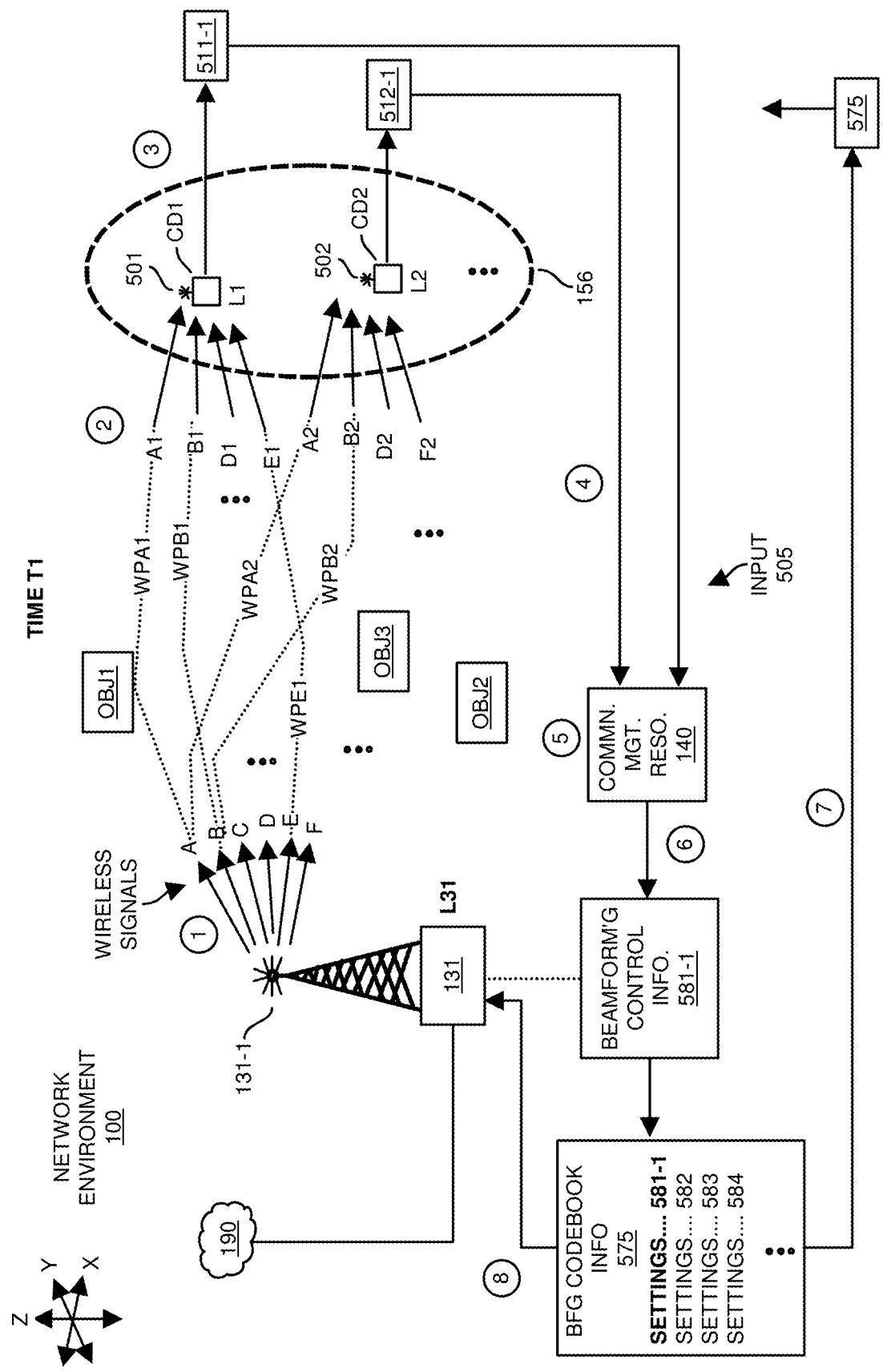
FIG. 5 is an example diagram illustrating beamforming settings management and code book updating as discussed herein.

FIG. 5 is an example diagram illustrating beamforming management and code book updating as discussed herein.

In this example, after pairing the wireless station 131 (such as gNodeB) with the communication devices CD1, CD2, etc., (such as via establishing wireless connectivity), the wireless station 131 transmits (such as via operations 330 and 430) respective wireless signals from the antenna hardware 131-1 in the network environment over different wireless paths (a.k.a., different wireless beams generated by the wireless station 131 via beamforming). The wireless beams can be transmitted simultaneously or at different times. The communication devices monitor for the communications to determine a direction (angle) of receiving each wireless beam.

In theory, the wireless stations as discussed herein can transmit and receive wireless signals at an infinite number of angular settings in 3 dimensional space (X-Y-Z space). In accordance with one example, each of the wireless stations (such as wireless station 131, communication device CD1, CD2, etc.) can be configured to support directional beamforming in a finite number of settings such as 300 or other suitable value such as greater or less than 300. The operations as discussed herein can be implemented to reduce a number of settings in a respective beamforming codebook to a fewer number than 300 (or other suitable value) that provides good wireless connectivity between the wireless station 131 and each of multiple different clusters of communication devices as opposed to individual beamforming settings in the codebook for each of the 300 possible settings or settings associated with each communication device supported by the wireless station 131.

For example, in processing operation #1, at or around time T1, the wireless station 131 wirelessly transmits a first wireless signal along angular direction A (having a respective angle in elevation and a respective angle in azimuth) over a first wireless path WPA (such as one or more wireless paths WPA1, WPA2, etc.) in the network environment 100; the wireless station 131 wirelessly transmits a second wireless signal along angular direction B (having a respective angle in elevation and a respective angle in azimuth) over a second wireless path WPB (such as one or more paths WPBA1, WPB2, etc.) in the network environment 100; the wireless station 131 wirelessly transmits a third wireless signal along angular direction C (having a respective angle in elevation and a respective angle in azimuth) over a third wireless path WPC (such as one or more wireless paths WPC1, WPC2, etc.) in the network environment 100; the wireless station 131 wirelessly transmits a fourth wireless signal along angular direction D (having a respective angle in elevation and a respective angle in azimuth) over a fourth wireless path in the network environment 100; the wireless station 131 wirelessly transmits a fifth wireless signal along angular direction E (having a respective angle in elevation and a respective angle in azimuth) over a fifth wireless path in the network environment 100; the wireless station 131 wirelessly transmits a sixth wireless signal along angular direction F (having a respective angle in elevation and a respective angle in azimuth) over a sixth wireless path in the network environment 100; and so on.

Accordingly, via communications over the different wireless paths, the communication devices are able to determine which of the wireless beams are best received by a respective communication device and at what beamforming angle.

As further shown, the network environment 100 includes one or more physical objects such as physical objects OBJ1, OBJ2, OBJ3, etc. The wireless signals transmitted by the wireless station 131 can travel directly (such as via line of sight through the air) from the wireless station 131 to each of the communication devices CD1, CD2, etc., in the cluster 156. Additionally or alternatively, the wireless signals transmitted from wireless station 131 can be reflected off any of one or more of the objects and be received by a respective communication device in the cluster 156.

Accordingly, each of the communication devices in the cluster 156 receives one or more of the different wireless signals transmitted by the wireless station 131 from the same or different angles depending on the wireless paths. Reception and/or strength of receiving the transmitted wireless signals from the wireless station 131-1 may vary depending upon movement of the objects and/or the communication devices in the cluster 156

Note that each of the communication devices in the cluster 156 includes appropriate antenna hardware and corresponding antenna elements to receive the wireless signals transmitted from the wireless station 131 from different angles. In certain instances, a respective communication device in the cluster 156 may not receive one or more of the wireless signals transmitted by the wireless station 131 and corresponding antenna hardware 131-1 due to signal blocking, interference, etc. As previously discussed, this may change over time.

As a more specific example as shown, in processing operation #2, each of the communication devices in the cluster 156 monitors for receipt of the wireless signals A, B, C, D, E, F, etc., (such as test wireless signal) transmitted by the wireless station 131 at the different angles (directions) over different respective wireless paths. Note that each of the wireless paths such as wireless path WPA1 and WPA2 may be substantially the same wireless path or different wireless paths; each of the wireless paths such as wireless path WPB1 and WPB2 may be substantially the same wireless path or different wireless paths; and so on.

In this example, the communication device CD1 receives a portion of the original wireless signal (such as test wireless signal) transmitted along angular direction A and wireless path WPA1 from wireless station 131 as a wireless signal received along angular direction A1 (i.e., A1 can be a first angular direction of the communication device 121 receiving the signal over wireless path WPA1); the communication device CD1 receives a portion of the original wireless signal transmitted along angular direction B and wireless path WPB1 from wireless station 131 as a wireless signal received along angular direction B1 (i.e., a second angular direction such as angle B1 at which the communication device 121 receives the signal over the wireless communication protocol WPB1); the communication device CD1 does not receive signal C or receives it at a very low power; the communication device CD1 receives a portion of the original wireless signal transmitted along angular direction D and wireless path WPD1 from wireless station 131 as a wireless signal received along angular direction D1 (i.e., a fourth angular direction such as angle D1); the communication device CD1 receives a portion of the original wireless signal transmitted along angular direction E from wireless station 131 as a wireless signal received along angular direction E1 (i.e., a fifth angular direction). Assume that the communication device does not receive the wireless energy associated with the wireless signal transmitted from the wireless station 131 along angular direction F.

As further shown, the communication device CD2 receives a portion of the original wireless signal transmitted along angular direction A and wireless path WPA from wireless station 131 as a wireless signal received along angular direction A2 (i.e., A2 represents an angular direction of the communication device 121 receiving the signal over wireless path WPA2); the communication device CD2 receives a portion of the original wireless signal transmitted along angular direction B from wireless station 131 as a wireless signal received along angular direction B2 (i.e., B2 represents an angular direction of the communication device 121 receiving the signal over wireless path WPB2); the communication device CD1 does not receive signal C or receives it at a very low power; the communication device CD2 receives a portion of the original wireless signal transmitted along angular direction D from wireless station 131 as a wireless signal received along angular direction D2 (i.e., C2 represents an angular direction of the communication device 121 receiving the signal over wireless path WPC2); the communication device CD2 receives a portion of the original wireless signal transmitted along angular direction F from wireless station 131 as a wireless signal received along angular direction F2 (i.e., F2 represents an angular direction of the communication device 121 receiving the signal over wireless path WPF2). Assume that the communication device does not receive the wireless energy associated with the wireless signal transmitted from the wireless station 131 along angular direction E.

The monitoring at communication devices of the test wireless signals at different angular directions with respect to the antenna hardware 131-1 transmitted by the wireless station 131 provides insight as to which of multiple different angles of transmitting wireless communications from the wireless station 131 and corresponding antenna hardware 131-1 provide best conveyance of wireless communications to the communication devices in cluster 156. As previously discussed, each of the communication devices determines the angles of receiving the transmitted wireless signals (such as via channel matrix information indicating weight coefficients applied at the communication devices to receive wireless signals, the weight coefficients indicating angular directions of the communication devices receiving the wireless signals over different wireless paths from the wireless station 131), produces respective feedback indicating the different angles (such as channel matrix information or other suitable information) of receiving the wireless signals, and communicates the respective angular feedback information 511 and 512 (such as channel matrix information or other suitable information) to the communication management resource 140 associated with the wireless station 131. The communication management resource 140 can be implemented at any location in the network environment 100 such as wireless station 131, edge computing node supporting multiple gNodeB processing, communication device, etc.

Figure 6:
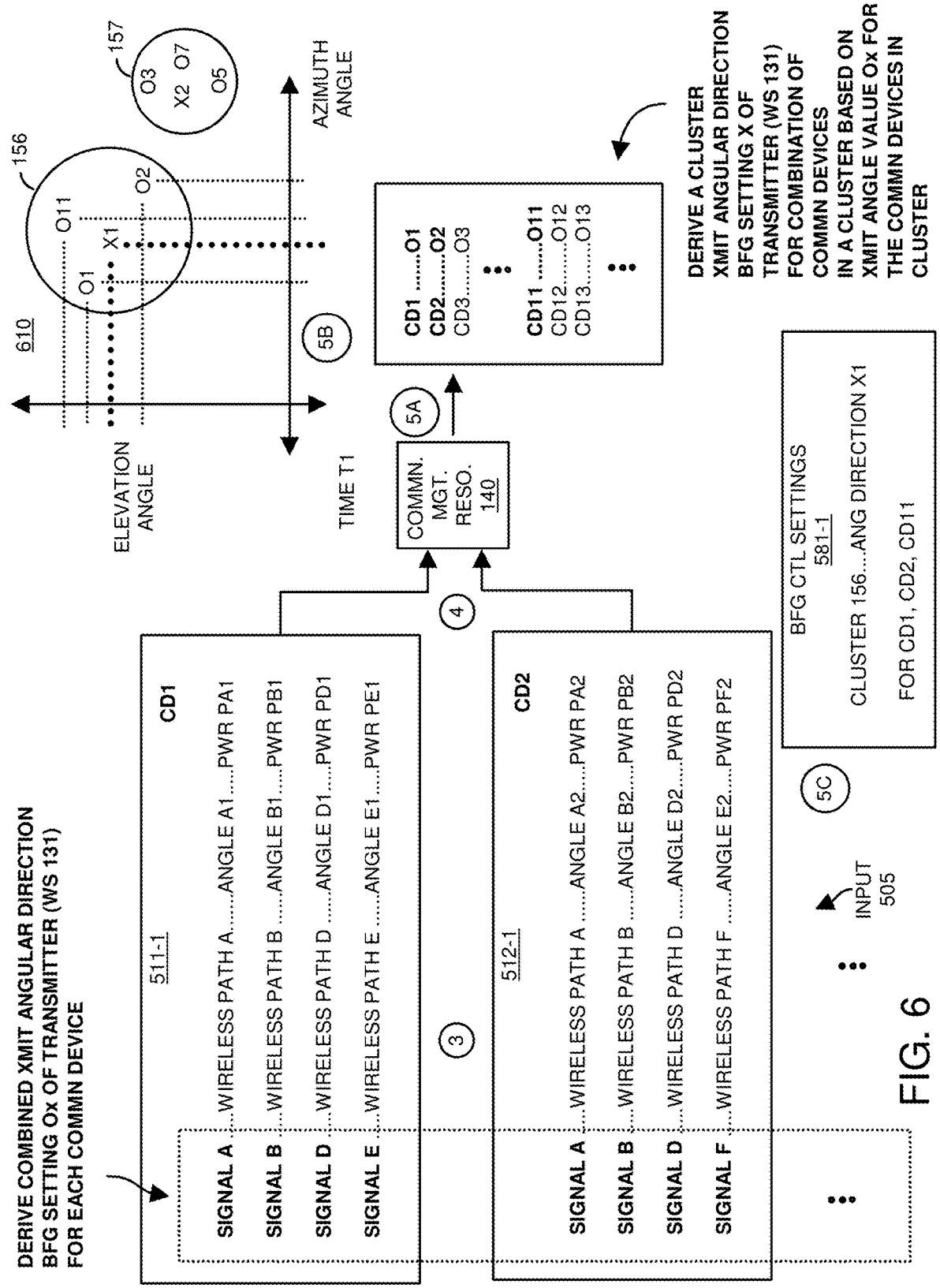
FIG. 6 is an example diagram illustrating derivation of beamforming settings associated with feedback from multiple communication devices as discussed herein.

See FIG. 6 for details of processing operations #3, #4, #5, and #6.

Note that input 505 indicates the feedback information received from the communication devices in the cluster 156.

FIG. 6 is an example diagram illustrating derivation of beamforming settings associated with feedback from multiple communication devices as discussed herein.

More specifically, in processing operation #3, as further shown in FIG. 6, a communication management resource in the communication device CD1 or other suitable entity produces the respective feedback 511-1 (such as channel matrix information or other suitable information) indicating that: i) the communication device CD1 received the portion of the original wireless signal transmitted along angular direction A associated with wireless path WPA1 (i.e., wireless beam) from wireless station 131 as a wireless signal received along angular direction A1 (i.e., a first angular direction A1) at wireless power level PA1; ii) the communication device CD1 received the portion of the original wireless signal transmitted along angular direction B associated with wireless path WPB1 from wireless station 131 as a wireless signal received along angular direction B1 (i.e., a second angular direction B1) at wireless power level PB1; iii) the communication device CD1 received the portion of the original wireless signal transmitted along angular direction D associated with wireless path WPD1 from wireless station 131 as a wireless signal received along angular direction D1 (i.e., a fourth angular direction D1) at wireless power level PD1, iv) the communication device CD1 received the portion of the original wireless signal transmitted along angular direction E associated with wireless path WPE1 from wireless station 131 as a wireless signal received along angular direction E1 (i.e., a fifth angular direction E1) at wireless power level PE1.

Further, in processing operation #3, as further shown in FIG. 6, the communication device CD2 or other suitable entity produces the respective feedback 511-2 (such as channel matrix information) indicating that: i) the communication device CD2 received the portion of the original wireless signal transmitted along angular direction A associated with wireless path WPA2 from wireless station 131 as a wireless signal received along angular direction A2 (i.e., a respective angular direction A2) at wireless power level PA2; ii) the communication device CD2 received the portion of the original wireless signal transmitted along angular direction B associated with wireless path WPB2 from wireless station 131 as a wireless signal received along angular direction B2 (i.e., a respective angular direction B2) at wireless power level PB2; iii) the communication device CD1 received the portion of the original wireless signal transmitted along angular direction D associated with wireless path WPD2 from wireless station 131 as a wireless signal received along angular direction D2 (i.e., a respective angular direction D2), iv) the communication device CD1 received the portion of the original wireless signal transmitted along angular direction F associated with wireless path WPF2 from wireless station 131 as a wireless signal received along angular direction F1 (i.e., a respective angular direction F1).

In a similar manner, each of the communication devices generates the corresponding feedback indicating angles of receiving the different wireless signals transmitted by the wireless station 131.

In processing operation #4, the communication device CD1 or other suitable entity communicates the feedback 511-1 over a respective wireless communication link to the communication management resource 140 associated with the wireless station 131. The communication device CD2 or other suitable entity communicates the feedback 512-1 over a respective wireless communication link through the wireless station 131 to the communication management resource 140. Note that the feedback from each of the communication devices can be encoded in any suitable manner.

In processing operation #5 (such as operation #5A, operation #5B, and operation #5C), the communication management resource 140 processes and consolidates the received feedback 511-1 and 512-1 to produce corresponding common beamforming control settings 581-1 to collectively communicate with the multiple communication devices CD1 and CD2 in cluster 156.

The communication management resource 140 can be configured to generate settings for one or more wireless beams which to communicate from the wireless station to each of the communication devices in a respective cluster. Thus, communication management resource 140 can be configured to produce settings for a single wireless beam or settings for multiple wireless beams from the wireless station 131 that collectively provide good wireless connectivity to each of the multiple communication devices in the cluster 156.

Further in this example, based on the received feedback 511-1 in processing operation #4, the communication management resource 140 detects that a wireless signal transmitted by the wireless station 131 at angular direction A (wireless path A at corresponding angle A) is received by the communication device CD1 at a good power level such as power level PA1 above a threshold level. Based on the received feedback 511-1, the communication management resource 140 detects that a wireless signal transmitted by the wireless station 131 at angular direction B (wireless path B at corresponding angle B) is received by the communication device CD1 at a good power level such as power level PB1 above a threshold level. Based on the received feedback 511-1, the communication management resource 140 detects that a wireless signal transmitted by the wireless station 131 at angular direction D (wireless path D at corresponding angle D) is received by the communication device CD1 at a good power level such as power level PD1 above a threshold level. Based on the received feedback 511-1, the communication management resource 140 detects that a wireless signal transmitted by the wireless station 131 at angular direction E (wireless path E at corresponding angle E) is received by the communication device CD1 at a good power level such as power level PE1 above a threshold level. The feedback 511-1 indicates that the communication device CD 1 did not receive wireless signals transmitted from direction C and F.

Based on the received feedback 512-1 in processing operation #4, the communication management resource 140 detects that a wireless signal transmitted by the wireless station 131 at angular direction A (wireless path A at corresponding angle A) is received by the communication device CD2 at a good power level such as power level PA2 above a threshold level. Based on the received feedback 512-1, the communication management resource 140 detects that a wireless signal transmitted by the wireless station 131 at angular direction B (wireless path B at corresponding angle B) is received by the communication device CD2 at a good power level such as power level PB2 above a threshold level. Based on the received feedback 512-1, the communication management resource 140 detects that a wireless signal transmitted by the wireless station 131 at angular direction D (wireless path D at corresponding angle D) is received by the communication device CD2 at a good power level such as power level PD2 above a threshold level. Based on the received feedback 512-1, the communication management resource 140 detects that a wireless signal transmitted by the wireless station 131 at angular direction F (wireless path F at corresponding angle F) is received by the communication device CD1 at a good power level such as power level PF1 above a threshold level. The feedback 512-1 indicates that the communication device CD2 did not receive wireless signals transmitted from direction C and E.

In a similar manner, the communication management resource 140 receives and processes feedback from multiple different communication devices in the network environment.

In processing operation #5A, the communication management resource 140 converts the received feedback into a single consolidated transmit angular direction for each communication device.

For example, the communication management resource 140 knows the angles (A, B, C, D, E, etc.) at which each of the test wireless signals are communicated to the communication devices CD1, CD2, etc. Based on the feedback, the communication management resource 140 is aware of the different angles (angular directions) at which the signals are received by a respective communication device (which may depend on an orientation of the communication device). Based on the combinations of different directional beams transmitted by the wireless station 131 and the corresponding different angles at which the communication device received the wireless signals, the communication management resource 140 generates a respective overall directional beam (such as O1, O2, O3, etc.) representative of a combination of the transmitted wireless beans received by the respective communication device.

More specifically, in processing operation #5A, based upon the combination of wireless paths A, B, D, and E, supporting wireless connectivity between the wireless station 131 and the communication device CD1, and based on respective wireless paths and known different angles (directions) of transmitting the test wireless signals transmitted by the wireless station 131 and reception angles (directions) of the communication device CD1 (121) receiving the test wireless signals as indicated by the feedback 511-1, the communication management resource 140 produces an overall angular direction associated with the feedback 511-1 for communicating from the wireless station 131 to the communication device CD1. In this example, the communication management resource 140 generates the overall angular direction value O1 associated with communication device CD1 to indicate a corresponding desirable direction in which to communicate a wireless signal from the wireless station 131 to the communication device CD1 based on the feedback 511-1.

In one example, the overall angular direction value O1 represents an associated desired elevation angle and azimuth angle (i.e., direction) of communicating wireless signals from the antenna hardware 131-1 associated with the wireless station 131 based on the feedback 511-1. When deriving the respective overall angular direction value O1, such as based on averaging the respective angular transmission directions of wireless signals best received by the communication device CD1, the communication management resource 140 can be configured to account for the power level at which the respective communication device CD 1 received the test signals over the different wireless paths. For example, the higher the power level, the more weight the corresponding directional angle of the transmitted beam may be used to produce the overall angular direction value O1. The lower the power level, the less weight the corresponding directional angle of the transmitted beam may be used to produce the overall angular direction value O1. Thus, the overall angular direction value O1 can be a weighting of the different angles (directions) associated with the transmitted test wireless signals over wireless paths A, B, D, and E. If the power level of receiving wireless communications is used to provide weighting in generation of the corresponding overall angular direction value O1, this helps to ensure that directional beams from the wireless station 131 providing best wireless power received by the communication device CD1 are more heavily weighted and directional beams from the wireless station 130 providing less wireless power received by the communication device CD1 are less heavily weighted when producing the corresponding angular direction value O1.

As shown in processing operation #5B, the communication management resource 140 creates a respective map indicating the location of the overall angular direction value O1 in graph 610. As previously discussed, the overall angular direction value O1 (specific angular direction in which to transmit a respective wireless beam from the wireless station 131) includes an azimuth angle value and an elevation angle value associated with the wireless station 131 communicating a respective wireless beam from the corresponding antenna hardware 131-1.

Further in processing operation #5A, based upon the combination of wireless paths A, B, D, and F, supporting wireless connectivity between the wireless station 131 and the communication device CD2 during testing, and based on respective wireless paths capturing known different angles of transmitting the test wireless signals transmitted by the wireless station 131 and angles of the communication device CD2 (122) receiving the test wireless signals as indicated by the feedback 511-2, the communication management resource 140 produces an overall angular direction associated with the feedback 512-1. In this example, the communication management resource 140 generates the overall angular direction value O2 associated with communication device CD2 to indicate a corresponding desirable direction in which to communicate a wireless signal from the wireless station 131 to the communication device CD2 based on the feedback 512-1.

In one example, the overall angular direction value O2 represents an associated desired elevation angle and azimuth angle of communicating wireless signals from the wireless station 131 based on the feedback 512-1. When the deriving the respective overall angular direction value O2 such as based on averaging the respective directions of wireless signals best received by the communication device CD2, the communication management resource 140 can be configured to account for the power level at which the respective communication device CD2 received the test signals over the different wireless paths. For example, the higher the power level, the more weight the corresponding directional angle of the transmitted beam may be used to produce the overall angular direction value O2. The lower the power level, the less weight the corresponding directional angle of the transmitted beam may be used to produce the overall angular direction value O2. The overall angular direction value O2 can be a weighting of the different angles associated with the transmitted test wireless signals over wireless paths A, B, D, and F. If the power level of receiving wireless communications is used by communication management resource 140, this helps to ensure that directional beams from the wireless station 131 providing best wireless power received by the communication device CD2 are more heavily weighted to produce the overall angular direction value O2 and directional beams from the wireless station 130 providing less wireless power received by the communication device CD1 are less heavily weighted to produce the overall angular direction value O2.

As shown in processing operation #5B, the communication management resource 140 creates a respective map indicating the location of the overall angular direction value O2 in graph 610. As previously discussed, the overall angular direction value O2 (specific angular direction in which to transmit a respective wireless beam from the wireless station 131) includes and azimuth angle value and an elevation angle value associated with the wireless station 131 communicating a respective wireless beam from the corresponding antenna hardware 131-1.

In a similar manner, the communication management resource 140 processes the received feedback associated with each of multiple communication devices monitoring the wireless test signals as previously discussed. In processing operation #5B, the communication management resource 140 determines which of the different overall angular direction values are nearest in magnitude to each other to generate a respective common beamforming setting to support wireless communications to each of the communication devices using the same wireless beam. For example, it is known that based on magnitudes of the overall angular direction value O1 associated with the communication device CD1, the overall angular direction value O2 associated with the communication device CD2, and the overall angular direction value O11 associated with the communication device CD11, the values O1, O2, and O11 are quite close to the same angular direction.

In order to provide further consolidation of beamforming settings, further in processing operation #5B, the communication management resource produces a respective common angular direction value X1 to support wireless communications transmitted from the wireless station 131 and corresponding antenna hardware 131-1 to all of the communication devices CD1, CD2, CD11 in the corresponding cluster 156. Thus, instead of implementing different beamforming settings for each of the different communication devices for each of the overall angular direction values O1, O2, and O11, the common angular direction value X1 is sued to support wireless connectivity between a wireless station 131 and the communication devices in the cluster 156. Thus, the communication management resource 140 can be viewed as a consolidation function to produce an abridged codebook 575.

In processing operation #5C, to support subsequent communications from the wireless station to the cluster of communication devices, the communication management resource 140 updates corresponding beamforming control settings 581-1 to indicate the different communication devices that are present in the cluster 156 and corresponding angular direction of the wireless station 131 and corresponding antenna hardware 131-1 communicating wireless signals to the communication devices in the cluster 156.

Note that any suitable function can be used to derive the common angular direction value X1 from the overall angular direction values of communication devices in the cluster 156. In accordance with one example, the communication management resource 140 can be configured to implement quantization in each dimension (azimuth angle dimension and the elevation angle dimension) to produce a respective common angular direction value X1 for the communication devices in the cluster 156.

Alternatively, the communication management resource 141 can be configured to implement an average function to determine a centroid value associated with the overall angular direction values of communication devices in the cluster. Yet further, as previously discussed, a respective overall angular direction value O1 for a communication device can be determined based on applying different weight values to the different angles of transmission by the wireless station 131.

Referring again to FIG. 5, in processing operation #6, the communication management resource 140 updates original beamforming control information 581 to beamforming control information 581-1, which is subsequently used to transmit wireless signals from the wireless station 131 and corresponding antenna hardware 131-1 to the cluster 156 of communication devices.

In one example, the communication management resource 140 updates beamforming codebook information 575 to include the updated beamforming control settings 581-1 and/or other information associated with the feedback 511-1 and feedback 512-1. In this way, the beamforming codebook information 575 can be continuously updated over time as the communication management resource 140 receives feedback associated with the cluster 156 of communication devices.

As previously discussed, the beamforming codebook information 575 can be configured to include beamforming settings associated with each of multiple clusters. For example, as previously discussed, the beamforming control information 581-1 (a.k.a., settings 581-1) supports wireless connectivity with a first cluster 156 of communication devices; the beamforming control information 582 (also known as settings 582) supports wireless connectivity with a second cluster 157 of communication devices in the network environment 100; and so on.

Over time, the communication management resource 140 receives updated reception angle information from each of the communication devices in different clusters in a similar manner as previously discussed and updates the respective beamforming control settings based on the received feedback from communication devices in that cluster.

As further shown, in processing operation #7, as the beamforming codebook information 575 is updated, the wireless station 131 repeatedly communicates the updated beamforming codebook information 575 to the communication devices CD1, CD2, etc., in the cluster 156 as well as communication devices in other clusters. The processing of feedback information to generate shared or consolidated beamforming settings reduces the overall complexity of the corresponding beamforming codebook information 575 because fewer instances of beamforming settings are required to communicate with respective communication devices. Communication of the beamforming codebook information 575 provides notice to the communication devices in each of the clusters of the different angles from which to expect receipt of subsequent wireless signals from the wireless station 131 and corresponding antenna hardware 131-1.

The dynamic codebook as discussed herein can be configured to include beamforming control information 581-1 (such as to include matrix H information) for cluster 156. The communication devices in the cluster 156 use the matrix H information to apply to the corresponding communication devices V matrix information to set their respective antenna elements to receive communications from the wireless station 131. Thus, the set of communication devices in the cluster 156 can be configured to each use the same consolidated beamforming control information 581-1 to set their respective antenna elements to receive communications from the wireless station 131 at an appropriate angular direction.

Figure 7:
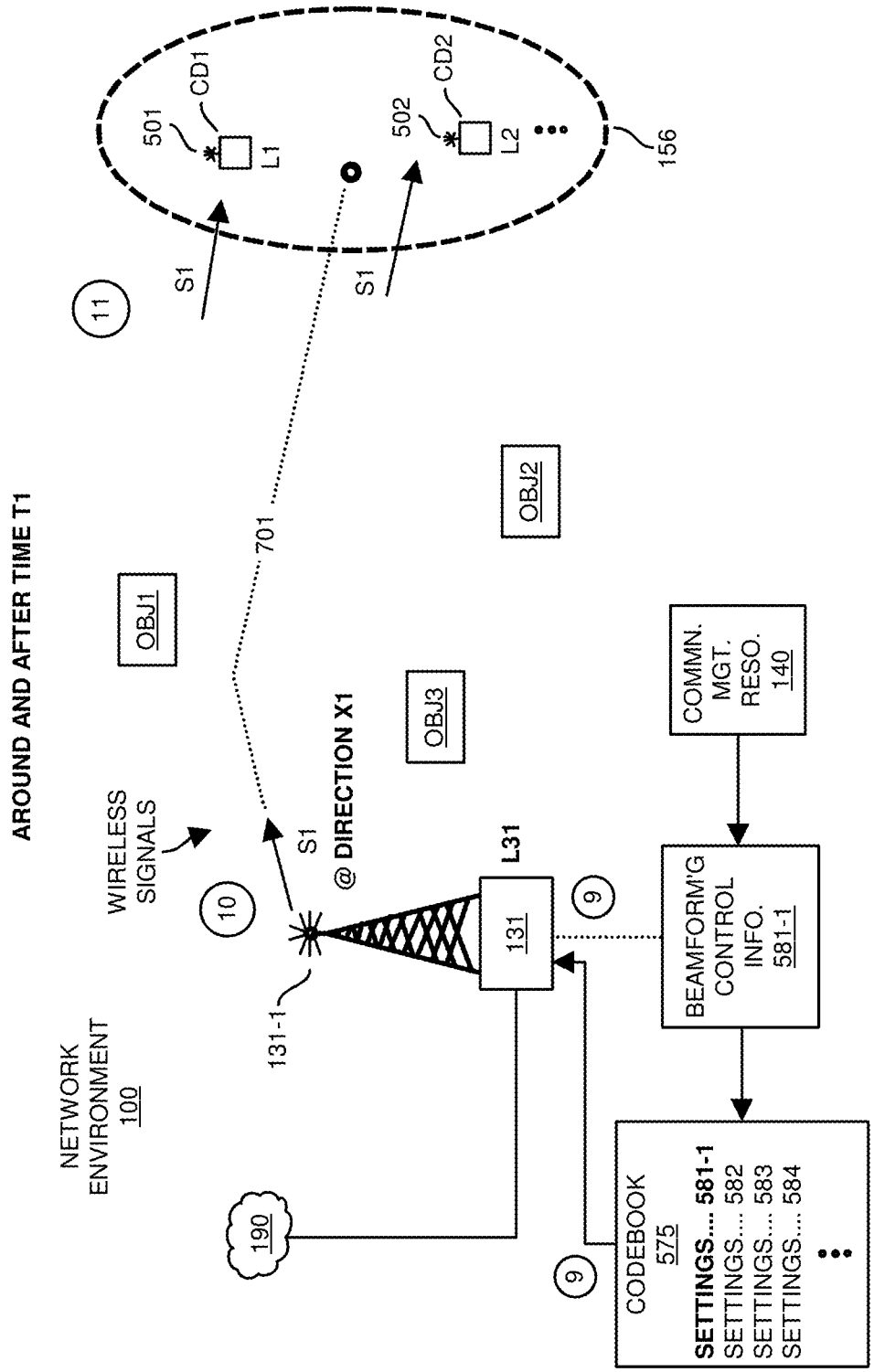
FIG. 7 is an example diagram illustrating implementation of beamforming settings as discussed herein.

As further shown, FIG. 7 illustrates subsequent use of the newly generated beamforming control information 581-1 to communicate from the wireless station 131 to the cluster 156 of communication devices.

FIG. 7 is an example diagram illustrating derivation of beamforming settings associated with feedback from multiple communication devices as discussed herein.

Based upon the prior learning and generation of the corresponding beamforming control information 581-1, when communicating with the cluster 156 of communication devices, the wireless station 131 or other suitable entity retrieves the beamforming control information 581-1 to determine the common angular direction value X1 previously stored for the cluster 156. The wireless station 131 then communicates signal S1 at the common angular direction value X1 over the wireless path 701. Each of the communication devices in the cluster 156 receives a respective portion of the wireless signal S1.

Figure 8:
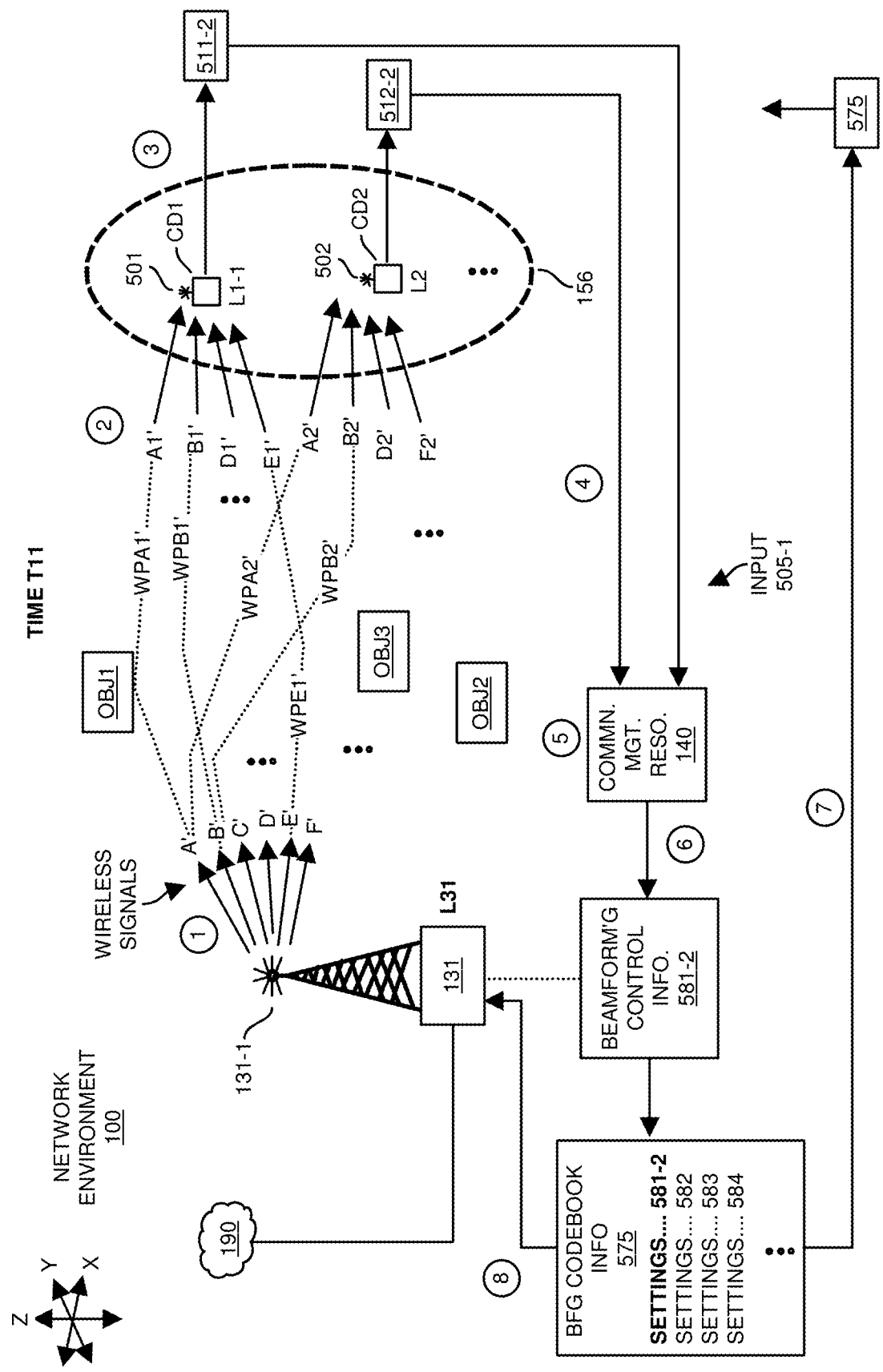
FIG. 8 is an example diagram illustrating beamforming settings management and code book updating as discussed herein.

FIG. 8 is an example diagram illustrating beamforming management and code book updating as discussed herein.

In this example, at or around time T11 (after time T1), the communication management resource 140 updates the beamforming control information based on new wireless path conditions as a result of one or more communication devices moving, objects moving, etc. In this example, the mutation device CD1 moves from location L1 to location L1-1.

After pairing the wireless station 131 with the communication devices CD1, CD2, etc., (such as via establishing wireless connectivity), the wireless station 131 transmits (such as via operations 330 and 430) respective wireless signals from the antenna hardware 131-1 in the network environment over different wireless paths (a.k.a., different wireless beams generated by the wireless station 131 via beamforming). The wireless beams can be transmitted simultaneously or at different times. The communication devices monitor for the communications to determine a direction (angle) of receiving each wireless beam.

In processing operation #1, at or around time T11, the wireless station 131 wirelessly transmits a first wireless signal along angular direction A' (having a respective angle in elevation and a respective angle in azimuth) over a first wireless path WPA' (such as one or more wireless paths WPA1', WPA2', etc.) in the network environment 100; the wireless station 131 wirelessly transmits a second wireless signal along angular direction B' (having a respective angle in elevation and a respective angle in azimuth) over a second wireless path WPB' (such as one or more paths WPB1', WPB2', etc.) in the network environment 100; the wireless station 131 wirelessly transmits a third wireless signal along angular direction C' (having a respective angle in elevation and a respective angle in azimuth) over a third wireless path WPC' (such as one or more wireless paths WPC1', WPC2', etc.) in the network environment 100; the wireless station 131 wirelessly transmits a fourth wireless signal along angular direction D' (having a respective angle in elevation and a respective angle in azimuth) over a fourth wireless path in the network environment 100; the wireless station 131 wirelessly transmits a fifth wireless signal along angular direction E' (having a respective angle in elevation and a respective angle in azimuth) over a fifth wireless path in the network environment 100; the wireless station 131 wirelessly transmits a sixth wireless signal along angular direction F' (having a respective angle in elevation and a respective angle in azimuth) over a sixth wireless path in the network environment 100; and so on.

Accordingly, via communications over the different wireless paths, the communication devices are able to determine which of the wireless beams are best received by a respective communication device and at what beamforming angle.

As further shown, the network environment 100 includes one or more physical objects such as physical objects OBJ1, OBJ2, OBJ3, etc. The wireless signals transmitted by the wireless station 131 can travel directly (such as via line of sight through the air) from the wireless station 131 to each of the communication devices CD1, CD2, etc., in the cluster 156. Additionally or alternatively, the wireless signals transmitted from wireless station 131 can be reflected off any of one or more of the objects and be received by a respective communication device in the cluster 156.

Accordingly, each of the communication devices in the cluster 156 receives one or more of the different wireless signals transmitted by the wireless station 131 from the same or different angles depending on the wireless paths.

Note that each of the communication devices in the cluster 156 includes appropriate antenna hardware and corresponding antenna elements to receive the wireless signals transmitted from the wireless station 131 from different angles. In certain instances, a respective communication device in the cluster 156 may not receive one or more of the wireless signals transmitted by the wireless station 131 and corresponding antenna hardware 131-1 due to signal blocking, interference, etc.

As a more specific example as shown, in processing operation #2, each of the communication devices in the cluster 156 monitors for receipt of the wireless signals (such as test wireless signal) transmitted by the wireless station 131 at the different angles over different respective wireless paths. Note that each of the wireless paths such as wireless path WPA1' and WPA2' may be substantially the same wireless path or different wireless paths; each of the wireless paths such as wireless path WPB1' and WPB2' may be substantially the same wireless path or different wireless paths; and so on.

In this example, the communication device CD1 receives a portion of the original wireless signal (such as test wireless signal) transmitted along angular direction A' and wireless path WPA1' from wireless station 131 as a wireless signal received along angular direction A1' (i.e., A1' can be a first angular direction of the communication device 121 receiving the signal over wireless path WPA1'); the communication device CD1 receives a portion of the original wireless signal transmitted along angular direction B' and wireless path WPB1' from wireless station 131 as a wireless signal received along angular direction B1' (i.e., a second angular direction such as angle B1' at which the communication device 121 receives the signal over the wireless path WPB1'); the communication device CD1 receives a portion of the original wireless signal transmitted along angular direction C' and wireless path WPC1' from wireless station 131 as a wireless signal received along angular direction C1' (i.e., a fourth angular direction such as angle C1'); the communication device CD does not receive signal D' or receives it at a very low power; the communication device CD1 receives a portion of the original wireless signal transmitted along angular direction E from wireless station 131 as a wireless signal received along angular direction E1' (i.e., a fifth angular direction). Assume that the communication device does not receive the wireless energy associated with the wireless signal transmitted from the wireless station 131 along angular direction F.

As further shown, the communication device CD2 receives a portion of the original wireless signal transmitted along angular direction A' and wireless path WPA' from wireless station 131 as a wireless signal received along angular direction A2' (i.e., A2' represents an angular direction of the communication device 121 receiving the signal over wireless path WPA2'); the communication device CD2 receives a portion of the original wireless signal transmitted along angular direction B' from wireless station 131 as a wireless signal received along angular direction B2' (i.e., B2' represents an angular direction of the communication device 121 receiving the signal over wireless path WPB2'); the communication device CD1 does not receive signal C' or receives it at a very low power; the communication device CD2 receives a portion of the original wireless signal transmitted along angular direction D' from wireless station 131 as a wireless signal received along angular direction D2' (i.e., C2' represents an angular direction of the communication device 121 receiving the signal over wireless path WPC2'); the communication device CD2 receives a portion of the original wireless signal transmitted along angular direction F' from wireless station 131 as a wireless signal received along angular direction F2' (i.e., F2' represents an angular direction of the communication device 121 receiving the signal over wireless path WPF2). Assume that the communication device does not receive the wireless energy associated with the wireless signal transmitted from the wireless station 131 along angular direction E'.

The monitoring at communication devices of the wireless signals transmitted by the wireless station 131 provides insight as to which of multiple different angles of transmitting wireless communications from the wireless station 131 and corresponding antenna hardware 131-1 provide best conveyance of wireless communications to the communication devices in cluster 156. As previously discussed, each of the communication devices determines the angles of receiving the transmitted wireless signals (such as via channel matrix information indicating weight coefficients applied at the communication devices to receive wireless signals, the weight coefficients indicating angular directions of the communication devices receiving the wireless signals over different wireless paths from the wireless station 131), produces respective feedback indicating the different angles (such as channel matrix information) of receiving the wireless signals, and communicates the respective angular feedback information 511-2 and 512-2 (such as channel matrix information or other suitable information) to the communication management resource 140 associated with the wireless station 131. See FIG. 9 for details of processing operations #3, #4, #5, and #6.

Note that input 505-1 indicates the feedback information received from the communication devices in the cluster 156.

Figure 9:
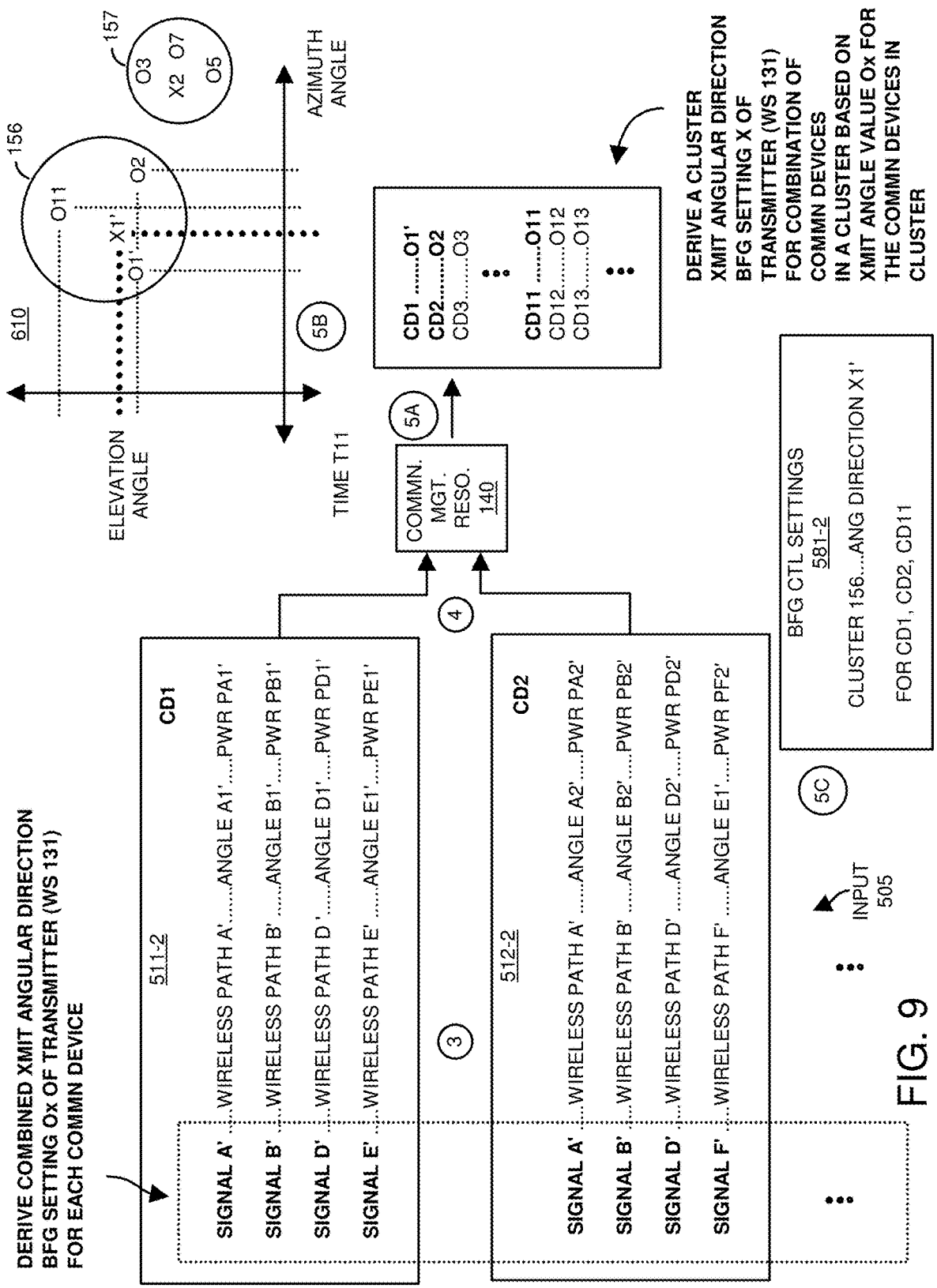
FIG. 9 is an example diagram illustrating derivation of beamforming settings associated with feedback from multiple communication devices as discussed herein.

FIG. 9 is an example diagram illustrating derivation of beamforming settings associated with feedback from multiple communication devices as discussed herein.

More specifically, in processing operation #3, as further shown in FIG. 9, a communication management resource in the communication device CD1 or other suitable entity produces the respective feedback 511-2 (such as channel matrix information or other suitable information) indicating that: i) the communication device CD1 received the portion of the original wireless signal transmitted along angular direction A associated with wireless path WPA1' (i.e., wireless beam) from wireless station 131 as a wireless signal received along angular direction A1' (i.e., a first angular direction A1') at wireless power level PA1'; ii) the communication device CD1 received the portion of the original wireless signal transmitted along angular direction B' associated with wireless path WPB1' from wireless station 131 as a wireless signal received along angular direction B1' (i.e., a second angular direction B1') at wireless power level PB1'; iii) the communication device CD1 received the portion of the original wireless signal transmitted along angular direction D' associated with wireless path WPD1' from wireless station 131 as a wireless signal received along angular direction D1' (i.e., a fourth angular direction D1') at wireless power level PD1'; iv) the communication device CD1 received the portion of the original wireless signal transmitted along angular direction E' associated with wireless path WPE1' from wireless station 131 as a wireless signal received along angular direction E1' (i.e., a fifth angular direction E1') at wireless power level PE1'.

Further, in processing operation #3, as further shown in FIG. 9, the communication device CD2 or other suitable entity produces the respective feedback 511-2 (such as channel matrix information) indicating that: i) the communication device CD2 received the portion of the original wireless signal transmitted along angular direction A' associated with wireless path WPA2' from wireless station 131 as a wireless signal received along angular direction A2' (i.e., a respective angular direction A2') at wireless power level PA2'; ii) the communication device CD2 received the portion of the original wireless signal transmitted along angular direction B' associated with wireless path WPB2' from wireless station 131 as a wireless signal received along angular direction B2' (i.e., a respective angular direction B2') at wireless power level PB2'; iii) the communication device CD1 received the portion of the original wireless signal transmitted along angular direction D' associated with wireless path WPD2' from wireless station 131 as a wireless signal received along angular direction D2' (i.e., a respective angular direction D2'), iv) the communication device CD1 received the portion of the original wireless signal transmitted along angular direction F associated with wireless path WPF2' from wireless station 131 as a wireless signal received along angular direction F1' (i.e., a respective angular direction F1').

In a similar manner, each of the communication devices generates the corresponding feedback indicating angles of receiving the different wireless signals transmitted by the wireless station 131.

In processing operation #4, the communication device CD1 or other suitable entity communicates the feedback 511-2 over a respective wireless communication link to the communication management resource 140 associated with the wireless station 131. The communication device CD2 or other suitable entity communicates the feedback 512-2 over a respective wireless communication link through the wireless station 131 to the communication management resource 140. Note that the feedback from each of the communication devices can be encoded in any suitable manner.

In processing operation #5 (such as operation #5A, operation #5B, and operation #5C), the communication management resource 140 processes and consolidates the received feedback 511-2 and 512-2 to produce corresponding common beamforming control settings 581-2 to collectively communicate with the multiple communication devices CD1 and CD2 in cluster 156. The communication management resource 140 can be configured to generate settings for one or more wireless beams which to communicate from the wireless station to each of the communication devices in a respective cluster. Thus, communication management resource 140 can be configured to produce settings for a single wireless beam or settings for multiple wireless beams from the wireless station 131 that collectively provide good wireless connectivity to each of the multiple communication devices in the cluster 156.

Based on the received feedback 511-2 in processing operation #4, the communication management resource 140 detects that a wireless signal transmitted by the wireless station 131 at angular direction A' (wireless path A' at corresponding angle A) is received by the communication device CD1 at a good power level such as power level PA1' above a threshold level. Based on the received feedback 511-2, the communication management resource 140 detects that a wireless signal transmitted by the wireless station 131 at angular direction B' (wireless path B' at corresponding angle B') is received by the communication device CD1 at a good power level such as power level PB1' above a threshold level. Based on the received feedback 511-2, the communication management resource 140 detects that a wireless signal transmitted by the wireless station 131 at angular direction C' (wireless path C' at corresponding angle C') is received by the communication device CD1 at a good power level such as power level PC1' above a threshold level. Based on the received feedback 511-2, the communication management resource 140 detects that a wireless signal transmitted by the wireless station 131 at angular direction E' (wireless path E' at corresponding angle E') is received by the communication device CD1 at a good power level such as power level PE1' above a threshold level. The feedback 511-2 indicates that the communication device CD1 did not receive wireless signals transmitted from direction D' and F'.

Based on the received feedback 512-1 in processing operation #4, the communication management resource 140 detects that a wireless signal transmitted by the wireless station 131 at angular direction A' (wireless path A' at corresponding angle A') is received by the communication device CD2 at a good power level such as power level PA2' above a threshold level. Based on the received feedback 512-2, the communication management resource 140 detects that a wireless signal transmitted by the wireless station 131 at angular direction B' (wireless path B' at corresponding angle B') is received by the communication device CD2 at a good power level such as power level PB2' above a threshold level. Based on the received feedback 512-2, the communication management resource 140 detects that a wireless signal transmitted by the wireless station 131 at angular direction D' (wireless path D' at corresponding angle D') is received by the communication device CD2 at a good power level such as power level PD2' above a threshold level. Based on the received feedback 512-2, the communication management resource 140 detects that a wireless signal transmitted by the wireless station 131 at angular direction F' (wireless path F' at corresponding angle F') is received by the communication device CD1 at a good power level such as power level PF1' above a threshold level. The feedback 512-2 indicates that the communication device CD2 did not receive wireless signals transmitted from direction C' and E'.

In a similar manner, the communication management resource 140 receives and processes feedback from multiple different communication devices in the network environment.

In processing operation #5A, the communication management resource 140 converts the received feedback into respective overall angular direction values. For example, the communication management resource 140 knows the angles (A', B', C', D', E', etc.) at which each of the test wireless signals are communicated to the communication devices CD1, CD2, etc., is transmitted. Based on the feedback, the communication management resource 140 is aware of the different angles (angular directions) at which the signals are received by the respective communication device (which may depend on an orientation of the communication device). Based on the combinations of different directional beams transmitted by the wireless station 131 and the corresponding different angles at which the communication device received the wireless signals, the communication management resource 140 generates a respective overall directional beam representative of a combination of the transmitted wireless beans received by the respective.

More specifically, in processing operation #5A, based upon the combination of wireless directional paths A', B', C', and E', supporting wireless connectivity between the wireless station 131 and the communication device CD1 during testing, and based on respective wireless paths accounting for known different angles of transmitting the test wireless signals transmitted by the wireless station 131 and angles of the communication device CD1 (121) receiving the test wireless signals as indicated by the feedback 511-2, the communication management resource 140 produces an overall angular direction associated with the feedback 511-2. In this example, the communication management resource 140 generates the overall angular direction value O1' (different than O1) associated with communication device CD1 to indicate a corresponding desirable direction in which to communicate a wireless signal from the wireless station 131 to the communication device CD1 based on the feedback 511-2.

In one example, the overall angular direction value O1' represents an associated desired elevation angle and azimuth angle of communicating wireless signals from the wireless station 131 based on the feedback 511-2. When deriving the respective overall angular direction value O1' such as based on averaging the respective directions of wireless signals best received by the communication device CD1, the communication management resource 140 can be configured to account for the power level at which the respective communication device CD 1 received the test signals over the different wireless paths. For example, the higher the power level, the more weight the corresponding directional angle of the transmitted beam may be used to produce the overall angular direction value O1'. The lower the power level, the less weight the corresponding directional angle of the transmitted beam may be used to produce the overall angular direction value O1'. Thus, the overall angular direction value O1' can be a weighting of the different angles associated with the transmitted test wireless signals over wireless paths A', B', D', and E'. If the power level of receiving wireless communications is used, this helps to ensure that directional beams from the wireless station 131 providing best wireless power received by the communication device CD1 or more heavily weighted and directional beams from the wireless station 130 providing less wireless power received by the communication device CD1.

As shown in processing operation #5B, the communication management resource 140 creates a respective map indicating the location of the overall angular direction value O1' in graph 610. As previously discussed, the overall angular direction value O1' (specific angle in which to transmit a respective wireless beam from the wireless station 131) includes and azimuth angle value and an elevation angle value associated with the wireless station 131 directionally communicating a respective wireless beam from the corresponding antenna hardware 131-1.

Further in processing operation #5A, based upon the combination of wireless paths A', B', D', and F', supporting wireless connectivity between the wireless station 131 and the communication device CD2 during testing, and based on respective wireless paths accounting for known different angles of transmitting the test wireless signals transmitted by the wireless station 131 and angles of the communication device CD2 (122) receiving the test wireless signals as indicated by the feedback 512-2, the communication management resource 140 produces an overall angular direction associated with the feedback 512-2. In this example, the communication management resource 140 generates the overall angular direction value O2 associated with communication device CD2 to indicate a corresponding desirable direction in which to communicate a wireless signal from the wireless station 131 to the communication device CD2 based on the feedback 511-2.

In one example, the overall angular direction value O2 represents an associated desired elevation angle and azimuth angle of communicating wireless signals from the wireless station 131 based on the feedback 512-2. When the deriving the respective overall angular direction value O2 such as based on averaging the respective directions of wireless signals best received by the communication device CD2, the communication management resource 140 can be configured to account for the power level at which the respective communication device CD2 received the test signals over the different wireless paths. For example, the higher the power level, the more weight the corresponding directional angle of the transmitted beam may be used to produce the overall angular direction value O2. The lower the power level, the less weight the corresponding directional angle of the transmitted beam may be used to produce the overall angular direction value O2. The overall angular direction value O2 can be a weighting of the different angles associated with the transmitted test wireless signals over wireless paths A', B', D', and F'. If the power level of receiving wireless communications is used by communication management resource 140, this helps to ensure that directional beams from the wireless station 131 providing best wireless power received by the communication device CD2 are more heavily weighted to produce the overall angular direction value O2 and directional beams from the wireless station 130 providing less wireless power received by the communication device CD1 are less heavily weighted to produce the overall angular direction value O2.

As shown in processing operation #5B, the communication management resource 140 creates a respective map indicating the location of the overall angular direction value O2 in graph 610. As previously discussed, the overall angular direction value O2 (specific angle in which to transmit a respective wireless beam from the wireless station 131) includes and azimuth angle value and an elevation angle value associated with the wireless station 131 communicating a respective wireless beam from the corresponding antenna hardware 131-1.

In a similar manner, the communication management resource 140 processes the received feedback associated with each of multiple communication devices monitoring the wireless test signals as previously discussed. In processing operation #5B, the communication management resource 140 determines which of the different overall angular direction values are nearest in magnitude to each other to generate a respective common beamforming setting to support wireless communications to each of the communication devices using the same wireless beam. For example, based on analysis by the communication management resource 140, it is known that based on the overall angular direction value O1' associated with the communication device CD1, the overall angular direction value O2 associated with the communication device CD2, and the overall angular direction value O11 associated with the communication device CD11 are quite close to the same angle.

In order to provide further consolidation of beamforming settings, further in processing operation #5B, the communication management resource produces a respective common angular direction value X1' to support wireless communications transmitted from the wireless station 131 and corresponding antenna hardware 131-1 to all of the communication devices CD1, CD2, CD11 in the corresponding cluster 156. Thus, instead of implementing different beamforming settings for each of the different communication devices, the common angular direction value X1' supports wireless connectivity between a wireless station 131 and the communication devices in the cluster 156. Thus, the communication management resource 140 can be viewed as a consolidation function.

To support subsequent communications from the wireless station 131 to the cluster of communication devices, the communication management resource 140 updates corresponding beamforming control settings 581-1 to indicate the different communication devices that are present in the cluster 156 and corresponding angular direction of the wireless station 131 and corresponding antenna hardware 131-1 communicating wireless signals to the communication devices in the cluster 156.

Note that any suitable function can be used to derive the common angular direction value X1' from the overall angular direction values of communication devices in the cluster 156. In accordance with one example, the communication management resource 140 can be configured to implement quantization in each dimension (azimuth angle dimension and the elevation angle dimension) to produce a respective common angular direction value for the communication devices in the cluster 156.

Alternatively, the communication management resource 141 can be configured to implement an average function to determine a centroid value associated with the overall angular direction values of communication devices in the cluster.

Referring again to FIG. 8, in processing operation #6, the communication management resource 140 updates original beamforming control information 581 to beamforming control information 581-2, which is subsequently used to transmit wireless signals from the wireless station 131 and corresponding antenna hardware 131-1 to the cluster 156 of communication devices.

In one example, the communication management resource 140 updates beamforming codebook information 575 to include the updated beamforming control settings 581-2 generated based on the feedback 511-2 and feedback 512-2. In this way, the beamforming codebook information 575 can be continuously updated over time as the communication management resource 140 receives feedback associated with the cluster 156 of communication devices.

As previously discussed, the beamforming codebook information 575 can be configured to include beamforming settings associated with each of multiple clusters. For example, as previously discussed, the beamforming control information 581-2 (a.k.a., settings 581-2) supports wireless connectivity with a first cluster 156 of communication devices; the beamforming control information 582 (also known as settings 582) supports wireless connectivity with a second cluster 157 of communication devices in the network environment 100; and so on.

Over time, the communication management resource 140 receives updated reception angle information from each of the communication devices in different clusters in a similar manner as previously discussed and updates the respective beamforming control settings based on the received feedback from communication devices in that cluster.

As further shown, in processing operation #7, as the beamforming codebook information 575 is updated, the wireless station 131 repeatedly communicates the updated beamforming codebook information 575 to the communication devices CD1, CD2, etc., in the cluster 156 as well as communication devices in other clusters. The processing of feedback information to generate shared or consolidated beamforming settings reduces the overall complexity of the corresponding beamforming codebook information 575 because fewer instances of beamforming settings are required to communicate with respective communication devices. Communication of the beamforming codebook information 575 provides notice to the communication devices in each of the clusters of the different angles from which to expect receipt of subsequent wireless signals from the wireless station 131 and corresponding antenna hardware 131-1.

As further shown, FIG. 7 illustrates subsequent use of the newly generated beamforming control information 581-2 to communicate from the wireless station 131 to the cluster 156 of communication devices.

Figure 18:
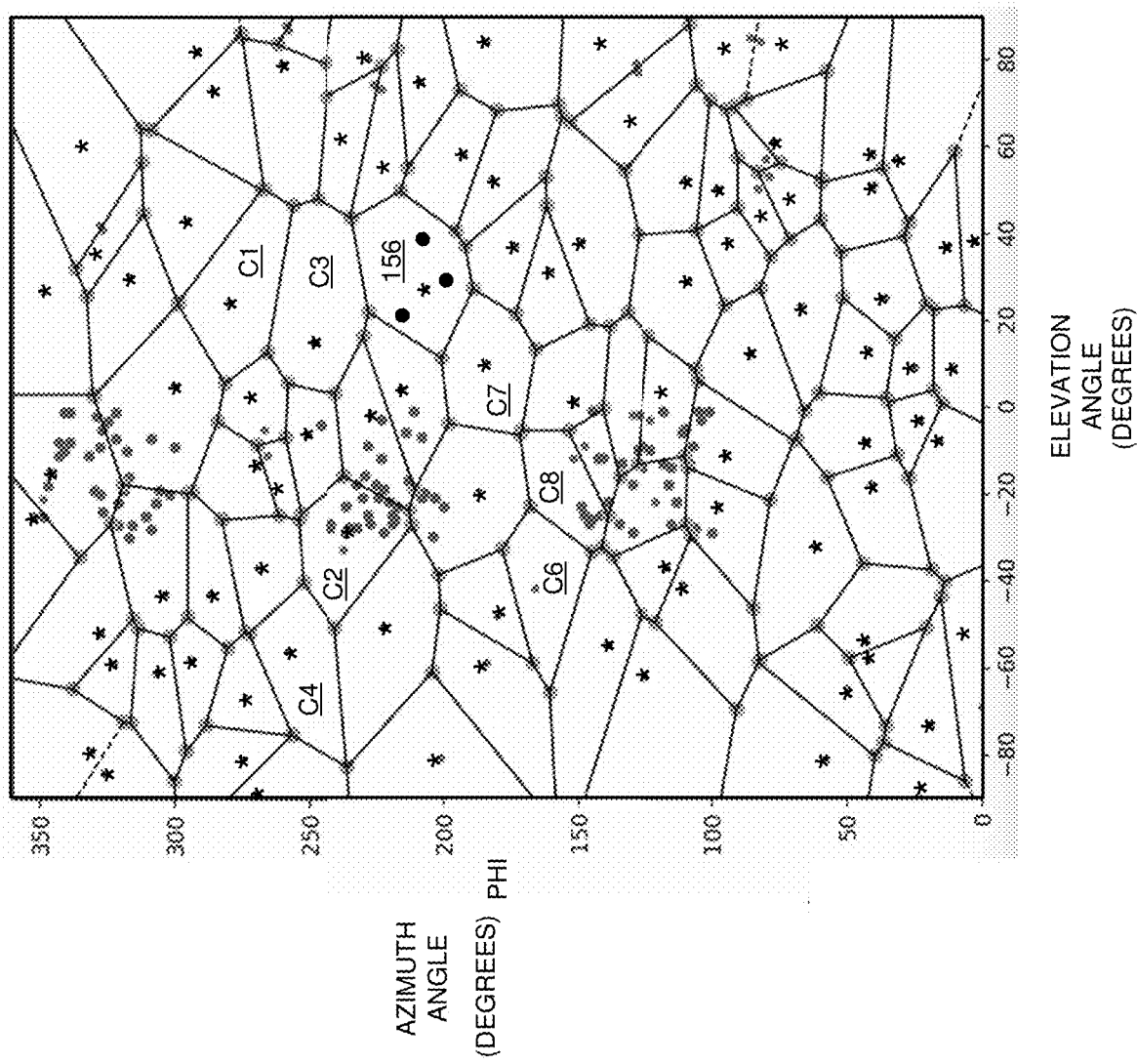
FIG. 18 is an example diagram illustrating partitioning of the angular directions in 3-D space into multiple clusters as discussed herein.

FIG. 18 is an example diagram illustrating partitioning of the angular directions in 3-D space into multiple clusters as discussed herein.

As shown in FIG. 18, the full 3-D range of possible angular directions can be partitioned into multiple clusters, each of which potentially includes a centroid angular direction value indicating a direction in which to transmit a respective wireless beam to one or more communication devices in the respective cluster. For example, cluster C1 includes a respective angular direction value (as specified by a corresponding asterisk symbol *) specifying a corresponding angular direction from the wireless station 131 in which to communicate with any communication devices in the cluster C1; cluster C2 includes a respective angular direction value specifying a corresponding angular direction from the wireless station 131 in which to communicate with any communication devices in the cluster C2; cluster C3 includes a respective angular direction value specifying a corresponding angular direction from the wireless station 131 in which to communicate with any communication devices in the cluster C3; cluster C156 includes a respective angular direction value specifying a corresponding angular direction from the wireless station 131 in which to communicate with any communication devices in the cluster C156; and so on.

Note that the beamforming code book as discussed herein can include a respective beamforming control settings for each of the clusters regardless of whether they include a respective communication device. Alternatively, the code book (such as a type 2 codebook or other codebook) communicated to each of the communication devices can be configured to include only beamforming settings associated with cluster having at least one communication device therein. As previously discussed, the size of the clusters, centroid of the cluster, number of communication devices in a respective cluster, etc., can change over time.

Figure 10:
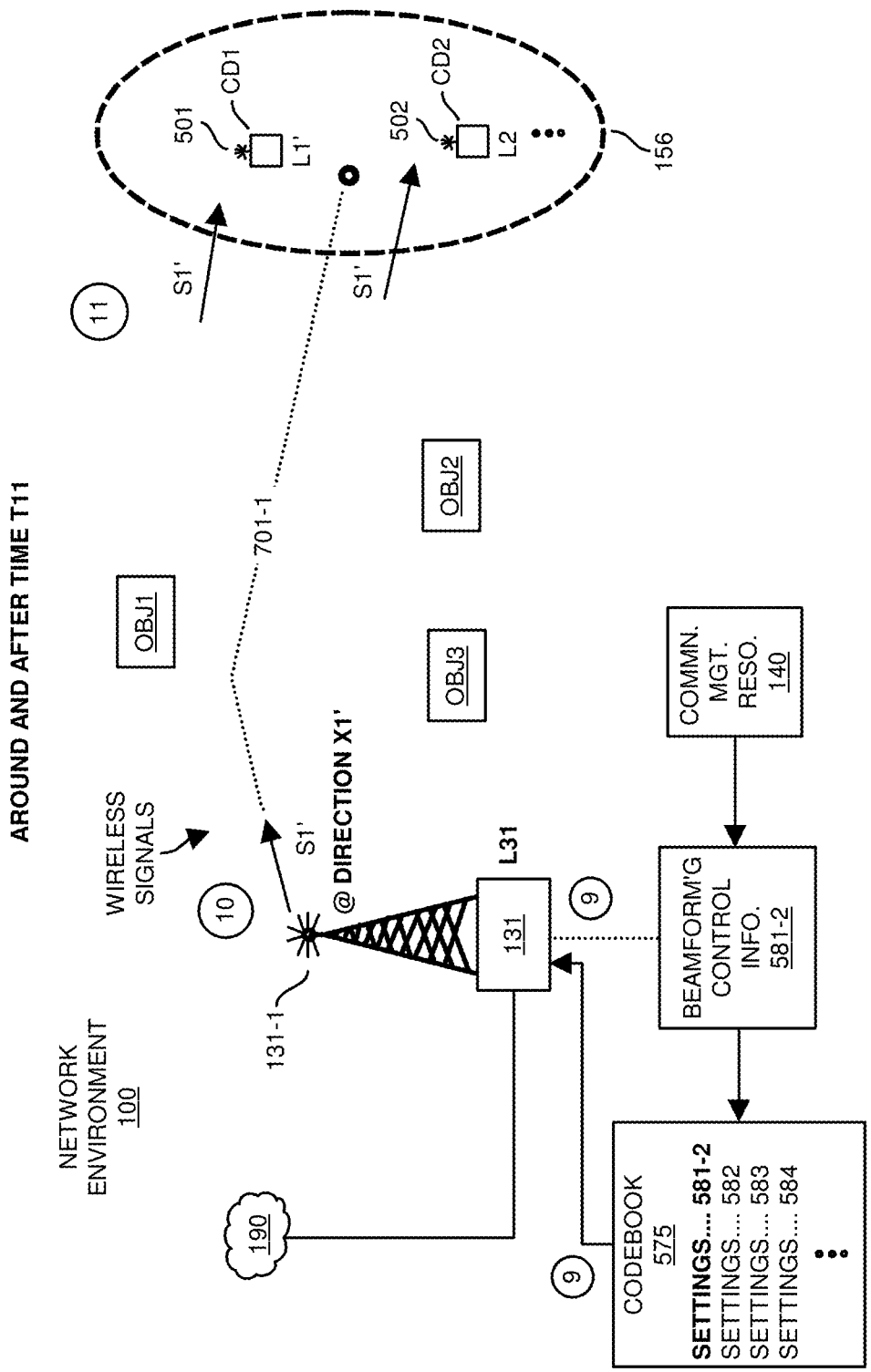
FIG. 10 is an example diagram illustrating implementation of beamforming settings as discussed herein.

FIG. 10 is an example diagram illustrating derivation of beamforming settings associated with feedback from multiple communication devices as discussed herein.

Based upon the prior learning and generation of the corresponding beamforming control information 581-2, when communicating with the cluster 156 of communication devices, the wireless station 131 or other suitable entity retrieves the beamforming control information 581-2 to determine the common angular direction value X1' previously stored for the cluster 156. The wireless station 131 then communicates signal S1' at the common angular direction value X1' over the wireless path 701-1. Each of the communication devices in the cluster 156 receives a respective portion of the wireless signal S1'.

Figure 11:
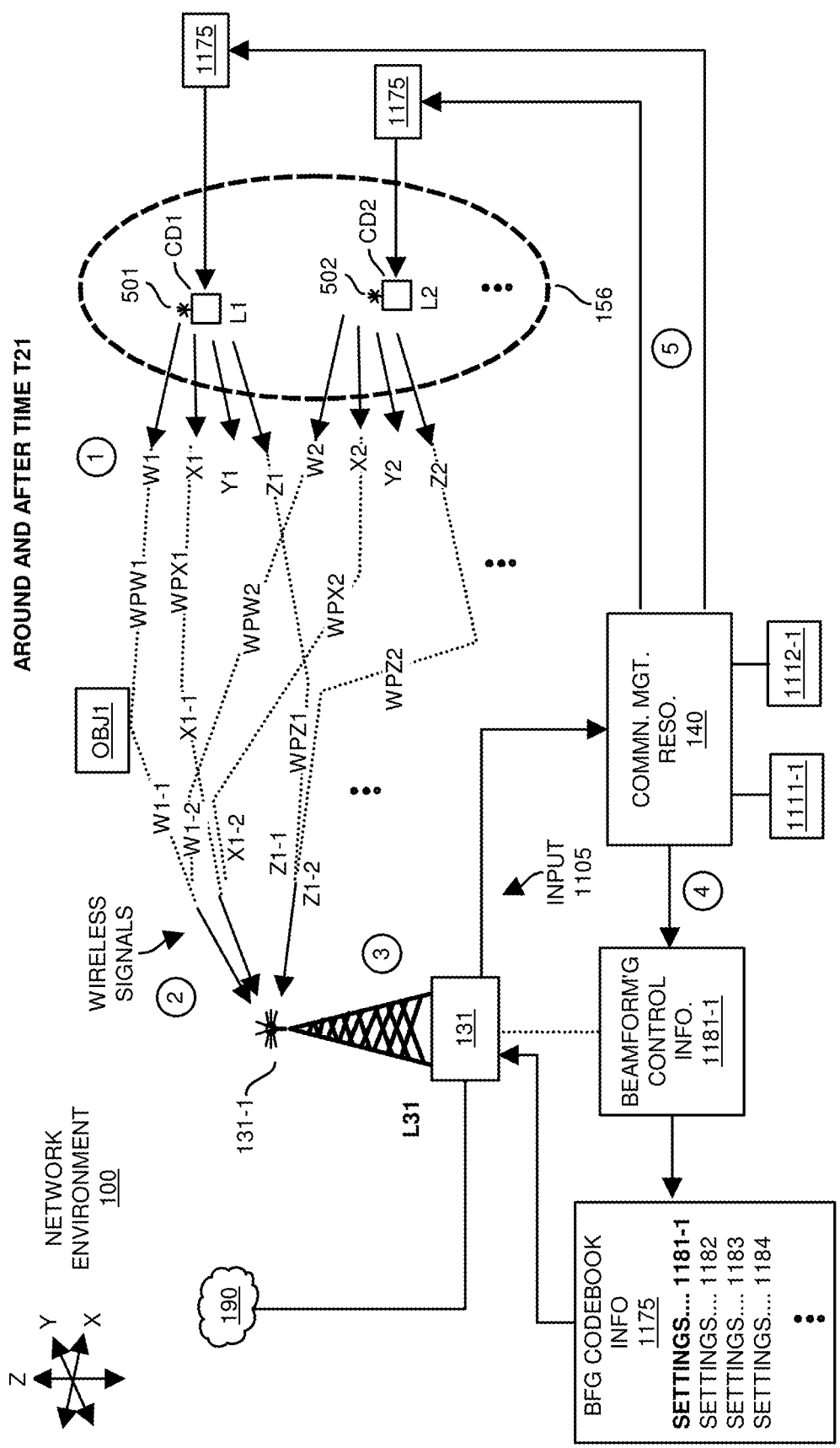
FIG. 11 is an example diagram illustrating beamforming settings management and code book updating as discussed herein.

FIG. 11 is an example diagram illustrating beamforming management and code book updating as discussed herein.

In this example, after pairing the wireless station 131 with the communication devices CD1, CD2, etc., (such as via establishing wireless connectivity) in a manner as previously discussed, the wireless station 131 receives respective wireless signals from the communication device 121 and communication device 122 over different wireless paths (a.k.a., different wireless beams generated by the wireless station 131 via beamforming). The communication management resource 140 can be configured to generate reception angle information (such as channel matrix information or other suitable information) indicating the different angles and/or power levels of receiving the wireless signals (such as directional wireless signals W1, X1, Y1, Z1, from communication device CD1 and directional wireless signals W2, X2, Y2, Z2, from communication device CD2) from the communication devices over the different wireless paths. Presumably, in this example, the wireless paths from the communication devices to the wireless station 131 are reciprocal in their ability to convey wireless communications in the reverse direction over the same wireless paths (via respective beamforming) from the wireless station 131 to the communication devices in the cluster 156.

In other words, it is assumed that the wireless path WPW1 carrying signal W1 from the communication device CD1 to the wireless station 131 supports the same wireless path WPW1 from the wireless station 131 to the communication device CD1 when the wireless station 131 transmits a respective wireless signal from the wireless station 131 (at an angle of receiving the signal W1) to the communication device CD1; it is assumed that the wireless path WPW2 carrying signal W2 from the communication device CD2 to the wireless station 131 supports the same wireless path WPW2 from the wireless station 131 to the communication device CD2 when the wireless station 131 transmits a respective wireless signal from the wireless station 131 (at an angle of receiving the signal W2) to the communication device CD2; and so on.

As a more specific example, in processing operation #1, at or around time T21, the communication device CD1 wirelessly transmits a first wireless signal along angular direction W1 (having a respective angle in elevation and a respective angle in azimuth) over a first wireless path WPW1 in the network environment 100; the communication device CD1 wirelessly transmits a second wireless signal along angular direction X1 (having a respective angle in elevation and a respective angle in azimuth) over a second wireless path WPX1 in the network environment 100; the communication device CD1 (i.e., wireless station) wirelessly transmits a third wireless signal along angular direction Y1 (having a respective angle in elevation and a respective angle in azimuth) over a third wireless path WPY1; the wireless station 131 wirelessly transmits a fourth wireless signal along angular direction Z1 (having a respective angle in elevation and a respective angle in azimuth) over a fourth wireless path WPZ1 in the network environment 100; and so on. As previously discussed, the communication device CD1 can be configured to transmit the wireless signals at the same time over different wireless channels or transmit the wireless signals at different times over the same or different wireless channels, etc.

Further, in processing operation #1, at or around time T21, the communication device CD2 wirelessly transmits a first wireless signal along angular direction W2 (having a respective angle in elevation and a respective angle in azimuth) over a wireless path WPW2 in the network environment 100; the communication device CD2 wirelessly transmits a wireless signal along angular direction X2 (having a respective angle in elevation and a respective angle in azimuth) over a second wireless path WPX2 in the network environment 100; the communication device CD2 (i.e., wireless station) wirelessly transmits a wireless signal along angular direction Y2 (having a respective angle in elevation and a respective angle in azimuth) over a wireless path WPY2; the wireless station 132 wirelessly transmits a wireless signal along angular direction Z2 (having a respective angle in elevation and a respective angle in azimuth) over a fourth wireless path WPZ2 in the network environment 100; and so on. As previously discussed, the communication device CD2 can be configured to transmit the wireless signals at the same time over different wireless channels or transmit the wireless signals at different times over the same or different wireless channels, etc.

As previously discussed, the network environment 100 includes one or more objects such as object OBJ1, OBJ2, OBJ3, etc. The wireless signals transmitted by the wireless station 131 can travel directly (such as via line of sight) from the communication device CD1 and CD2 to the wireless station 131. Additionally or alternatively, the wireless signals transmitted from the communication device CD1 and CD2 can be reflected off any of one or more of the objects and received by the wireless station 131. Accordingly, the wireless station 131 receives the different wireless signals transmitted from the communication devices CD1 and CD2 at different angles depending on the respective wireless paths.

Note that each of the communication devices in the cluster 156 includes appropriate antenna hardware and corresponding antenna elements to transmit the wireless signals (in different wireless beams) transmitted at the different angles from the wireless station 131. In certain instances, the wireless station 131 does not receive one or more of the wireless signals (such as Y1 and Y2) transmitted by the communication device CD1 and communication device CD2 due to signal blocking, interference, etc.

Note that each of the communication devices CD1, CD2, etc., the cluster 156 transmit signals that the same or different wireless paths. For example, because the communication devices CD1, CD2, etc., may reside very close to each other, the wireless path WPW1 may be substantially the same or different than the wireless path WPW2; wireless path WPX1 may be substantially the same or different than the wireless path WPX2; wireless path WPY1 may be substantially the same or different than the wireless path WPY2; wireless path WPZ1 may be substantially the same or different than the wireless path WPZ2; and so on.

In one example, assuming that the communication device CD1 is oriented in a similar manner as communication device CD2, when the wireless path WPW1 is substantially the same as wireless path WPW2, the angle of the communication device CD1 transmitting the corresponding signal along angular direction W1 is substantially the same as an angle of the communication device CD2 transmitting a corresponding signal along the angular direction W2; when the wireless path WPX1 is substantially the same as wireless path WPX2, the angle of the communication device CD1 transmitting the corresponding signal along angular direction X1 is substantially the same as an angle of the communication device CD2 transmitting a corresponding signal along the angular direction X2; when the wireless path WPY1 is substantially the same as wireless path WPY2, the angle of the communication device CD1 transmitting the corresponding signal along angular direction Y1 is substantially the same as an angle of the communication device CD2 transmitting a corresponding signal along the angular direction Y2; when the wireless path WPZ1 is substantially the same as wireless path WPZ2, the angle of the communication device CD1 transmitting the corresponding signal along angular direction Z1 is substantially the same as an angle of the communication device CD2 transmitting a corresponding signal along the angular direction Z2; and so on.

As a more specific example as shown, in processing operation #2, the wireless station 131 receives a portion of the wireless signal transmitted over the wireless path WPW1 from the communication device CD1 at a first angle W1-1; the wireless station 131 receives a portion of the wireless signal transmitted over the wireless path WPX1 from the communication device CD1 at a second angle X1-1; the wireless station 131 receives a portion (such as very a small portion or maybe no signal at all) of the wireless signal transmitted over the wireless path WPY1 from the communication device CD1 at a third angle Y1-1; the wireless station 131 receives a portion of the wireless signal transmitted over the wireless path WPZ1 from the communication device CD1 at a fourth angle Z1-1; and so on.

Further, in processing operation #2, the wireless station 131 receives a portion of the wireless signal transmitted over the wireless path WPW2 from the communication device CD2 at an angle W2-1; the wireless station 131 receives a portion of the wireless signal transmitted over the wireless path WPX1 from the communication device CD2 at a second angle X2-1; the wireless station 131 receives a portion (such as very a small portion) of the wireless signal transmitted over the wireless path WPY1 from the communication device CD2 at a third angle Y2-1; the wireless station 131 receives a portion of the wireless signal transmitted over the wireless path WPZ1 from the communication device CD2 at a fourth angle Z2-1; and so on.

In operation #3, the communication management resource 140 stores the angle information associated with receiving different wireless signals from the communication devices as status information 1111-1 and status information 1112-1.

Assuming wireless path reciprocity as previously discussed, the monitoring of wireless signals at the wireless station 131 provides insight as to which of multiple different angles of received wireless communications at the wireless station 131 from the communication devices in the cluster that provide best conveyance of wireless communications in a reverse direction from the wireless station 131 to the communication devices CD1 and CD2.

In one example, the wireless station 131 determines the angles of receiving the transmitted wireless signals (such as via channel matrix information indicating weight coefficients applied at the wireless station 131 to receive wireless signals, the weight coefficients indicating angular directions of the communication devices receiving the wireless signals over different wireless paths from the wireless station 131). As previously discussed, the communication management resource 140 associated with the wireless station 131 produces respective status information 1111-1 and 1112-1 indicating the different angles of receiving the wireless signals over different wireless paths from the communication devices.

Figure 12:
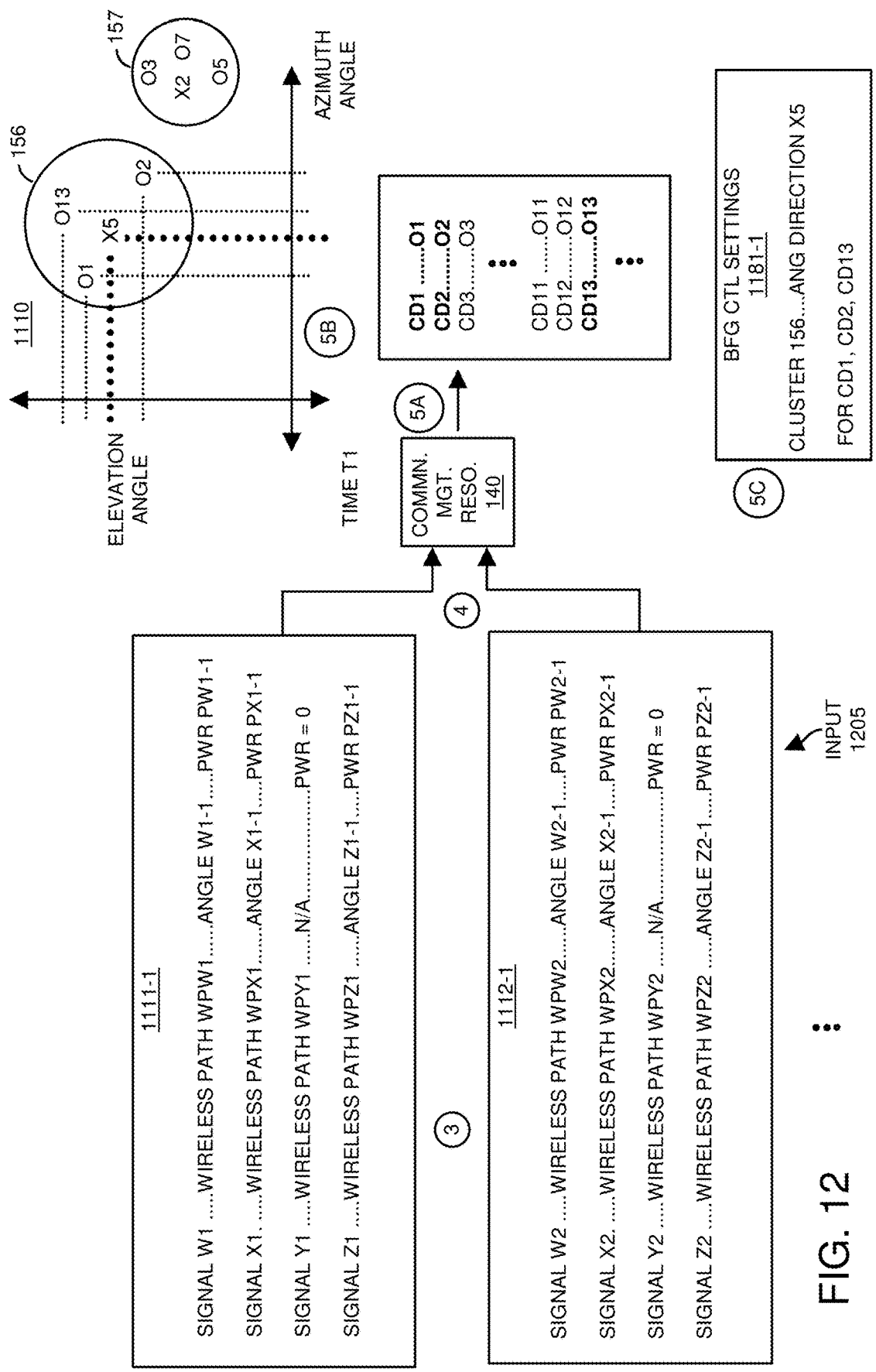
FIG. 12 is an example diagram illustrating derivation of beamforming settings associated with communications received from multiple communication devices as discussed herein.

As further shown in processing operation #4, and as further discussed in FIG. 12, the communication management resource 140 processes the status information 1111-1 and 1111-2 to generate the corresponding updated beamforming control information 1181-1 indicating how to control directionality of wireless signals transmitted from the wireless station 131 and corresponding antenna hardware 131-1 to the cluster 156 of communication devices CD1 and CD2. In other words, the communication management resource 140 consolidates and/or updated the beamforming settings associated with the beamforming codebook based on the received wireless signals transmitted from the communication devices CD1 and CD2. Details of consolidation and updating are shown in FIG. 12.

FIG. 12 is an example diagram illustrating derivation of beamforming settings associated with reception of signals from multiple communication devices as discussed herein.

In processing operation #3, the communication management resource 140 or other suitable entity generates the status information 1111-1 and 1112-1.

The status information 1111-1 generated by the communication management resource 140 indicates that the wireless station 131 and corresponding antenna hardware 131-1 received the signal W1 at angle W1-1 and at wireless power level PW1-1; the status information 1111-1 indicates that the wireless station 131 and corresponding antenna hardware 131-1 received the signal X1 at angle X1-1 and at wireless power level PX1-1; the status information 1111-1 indicates that the wireless station 131 and corresponding antenna hardware 131-1 received the signal Y1 at angle Y1-1 and at wireless power level PY1-1; the status information 1111-1 indicates that the wireless station 131 and corresponding antenna hardware 131-1 received the signal Z1 at angle Z1-1 and at wireless power level PZ1-1.

The status information 1111-1 generated by the communication management resource 140 indicates that the wireless station 131 and corresponding antenna hardware 131-1 received the signal W2 at angle W2-1 and at wireless power level PW2-1; the status information 1111-2 indicates that the wireless station 131 and corresponding antenna hardware 131-1 received the signal X2 at angle X2-1 and at wireless power level PX2-1; the status information 1111-1 indicates that the wireless station 131 and corresponding antenna hardware 131-1 received the signal Y2 at angle Y2-1 and at wireless power level PY2-1; the status information 1111-2 indicates that the wireless station 131 and corresponding antenna hardware 131-1 received the signal Z2 at angle Z2-1 and at wireless power level PZ2-1.

In processing operation #4, the communication management resource 140 retrieves the status information 1111-1 and status information 1112-1 for processing.

In processing operation #5 (such as operation #5A, operation #5B, and operation #5C), the communication management resource 140 processes and consolidates the received feedback 1111-1 and 1112-1 to produce corresponding common beamforming control settings 1181-1 to collectively communicate with the multiple communication devices CD1 and CD2 in cluster 156.

The communication management resource 140 can be configured to generate settings for one or more wireless beams in which to communicate from the wireless station 131 to each of the communication devices in a respective cluster. Thus, communication management resource 140 can be configured to produce settings for a single wireless beam or settings for multiple wireless beams from the wireless station 131 that collectively provide good wireless connectivity to each of the multiple communication devices in the cluster 156.

In processing operation #5A, the communication management resource 140 converts the received feedback into a single consolidated transmit angular direction for each communication device.

For example, the communication management resource 140 knows the directional angles of receiving the signals W1, X1, Y1, and Z1 from the communication device CD1; the communication management resource 140 knows the directional angles of receiving the signals W2, X2, Y2, and Z2 from the communication device CD2.

The communication management resource 140 can be configured to receive notification of the different angles of the communication devices transmitting the wireless signals W1, X1, Y1, and Z1 as well as wireless signals W2, X2, Y2, and Z2. Based on the status information, the communication management resource 140 is aware of the different angles (angular directions) at which the signals are received by the wireless station 131. Based on directional angles of receiving wireless signals or based on the combinations of different directional beams transmitted by the communication devices CD1, CD2, etc., and the corresponding different angles at which the wireless station 131 received the wireless signals, the communication management resource 140 generates a respective overall directional beam (such as O1, O2, O3, etc.) representative of a combination of the transmitted wireless beans received by the respective wireless station 131.

More specifically, in processing operation #5A, based upon the combination of wireless paths WPW1, WPX1, WPY1, and WPZ1, supporting wireless connectivity between the communication device CD1 and the wireless station 131, and potentially based on respective wireless paths and known different angles (directions) of transmitting the test wireless signals W1, X1, Y1, and Z1 transmitted by the communication device CD1 and reception angles (directions) of the wireless station 131 an corresponding antenna hardware 131-1 receiving the test wireless signals as indicated by the status information 1111-1, the communication management resource 140 produces an overall angular direction associated with the status information 1111-1 for communicating from the wireless station 131 and corresponding antenna hardware 131-1 to the communication device CD1. In this example, the communication management resource 140 generates the overall angular direction value O1 associated with communication device CD1 to indicate a corresponding desirable direction in which to communicate a wireless signal from the wireless station 131 to the communication device CD1 based on the status information 1111-1.

In one example, the overall angular direction value O1 represents an associated desired elevation angle and azimuth angle (i.e., direction) of communicating wireless signals from the antenna hardware 131-1 associated with the wireless station 131 based on the status information 1111-1. When deriving the respective overall angular direction value O1, such as based on averaging the respective angular transmission directions (W1-1, X1-1, Y1-1, and Z1-1) of wireless signals best received by the wireless station 131, the communication management resource 140 can be configured to account for the power level at which the respective wireless station 131 received the test signals over the different wireless paths. For example, the higher the power level, the more weight the corresponding directional angle of the received beam may be used to produce the overall angular direction value O1. The lower the power level, the less weight the corresponding directional angle of the transmitted beam may be used to produce the overall angular direction value O1. Thus, the overall angular direction value O1 can be a weighting of the different angles (directions) associated with the transmitted test wireless signals over wireless paths A, B, D, and E.

If the power level of receiving wireless communications is used to provide weighting in generation of the corresponding overall angular direction value O1, this helps to ensure that directional beams from the wireless station 131 providing best wireless power received by the communication device CD1 are more heavily weighted and directional beams from the wireless station 130 providing less wireless power received by the communication device CD1 are less heavily weighted when producing the corresponding angular direction value O1.

As shown in processing operation #5B, the communication management resource 140 creates a respective map indicating the location of the overall angular direction value O1 in graph 1110. As previously discussed, the overall angular direction value O1 (specific angular direction in which to transmit a respective wireless beam from the wireless station 131 and corresponding antenna hardware 131-1) includes an azimuth angle value and an elevation angle value associated with the wireless station 131 communicating a respective wireless beam from the corresponding antenna hardware 131-1.

Further, in processing operation #5A, based upon the combination of wireless paths WPW2, WPX2, WPY2, and WPZ2, supporting wireless connectivity between the communication device CD2 and the wireless station 131, and potentially based on respective wireless paths and known different angles (directions) of transmitting the test wireless signals W2, X2, Y2, and Z2 transmitted by the communication device CD2 and reception angles (directions) of the wireless station 131 an corresponding antenna hardware 131-1 receiving the test wireless signals as indicated by the status information 1111-2, the communication management resource 140 produces an overall angular direction associated with the status information 1111-2 for communicating from the wireless station 131 and corresponding antenna hardware 131-1 to the communication device CD2. In this example, the communication management resource 140 generates the overall angular direction value O2 associated with communication device CD2 to indicate a corresponding desirable direction in which to communicate a wireless signal from the wireless station 131 to the communication device CD2 based on the status information 1111-2.

In one example, the overall angular direction value O2 represents an associated desired elevation angle and azimuth angle (i.e., direction) of communicating wireless signals from the antenna hardware 131-1 associated with the wireless station 131 based on the status information 1111-2. When deriving the respective overall angular direction value O2, such as based on averaging the respective angular transmission directions (W2-1, X2-1, Y2-1, and Z2-1) of wireless signals best received by the wireless station 131, the communication management resource 140 can be configured to account for the power level at which the respective wireless station 131 received the test signals over the different wireless paths. For example, the higher the power level, the more weight the corresponding directional angle of the received beam may be used to produce the overall angular direction value O2. The lower the power level, the less weight the corresponding directional angle of the transmitted beam may be used to produce the overall angular direction value O2. Thus, the overall angular direction value O2 can be a weighting of the different angles (directions) associated with the transmitted test wireless signals over wireless paths A, B, D, and E.

If the power level of receiving wireless communications is used to provide weighting in generation of the corresponding overall angular direction value O2, this helps to ensure that directional beams from the wireless station 131 providing best wireless power received by the communication device CD2 are more heavily weighted and directional beams from the wireless station 130 providing less wireless power received by the communication device CD2 are less heavily weighted when producing the corresponding angular direction value O2.

As shown in processing operation #5B, the communication management resource 140 creates a respective map indicating the location of the overall angular direction value O2 in graph 1110. As previously discussed, the overall angular direction value O1 (specific angular direction in which to transmit a respective wireless beam from the wireless station 131 and corresponding antenna hardware 131-1) includes an azimuth angle value and an elevation angle value associated with the wireless station 131 communicating a respective wireless beam from the corresponding antenna hardware 131-1.

In a similar manner, the communication management resource generates a respective overall angular direction value O13 based on reception of wireless signals from communication device CD13.

In order to provide further consolidation of beamforming settings, further in processing operation #5B, the communication management resource 140 produces a respective common angular direction value X5 to support wireless communications transmitted from the wireless station 131 and corresponding antenna hardware 131-1 to all of the communication devices CD1, CD2, CD13 in the corresponding cluster 156. Thus, instead of implementing different beamforming settings for each of the different communication devices for each of the overall angular direction values O1, O2, and O11, the common angular direction value X5 is used to support wireless connectivity between a wireless station 131 and the communication devices in the cluster 156. Thus, the communication management resource 140 can be viewed as a consolidation function to produce an abridged codebook 575.

In processing operation #5C, to support subsequent communications from the wireless station to the cluster of communication devices, the communication management resource 140 updates corresponding beamforming control settings 1181-1 to indicate the different communication devices that are present in the cluster 156 and corresponding angular direction of the wireless station 131 and corresponding antenna hardware 131-1 communicating wireless signals to the communication devices in the cluster 156.

Note that any suitable function can be used to derive the common angular direction value X5 from the overall angular direction values of communication devices in the cluster 156. In accordance with one example, the communication management resource 140 can be configured to implement quantization in each dimension (azimuth angle dimension and the elevation angle dimension) to produce a respective common angular direction value X5 for the communication devices in the cluster 156.

Alternatively, the communication management resource 141 can be configured to implement an average function to determine a centroid value (such as average of angled O1, O2, and O13) associated with the overall angular direction values of communication devices in the cluster. Yet further, as previously discussed, a respective overall angular direction value O1 for a communication device can be determined based on applying different weight values to the different angles of transmission by the wireless station 131.

Figure 13:
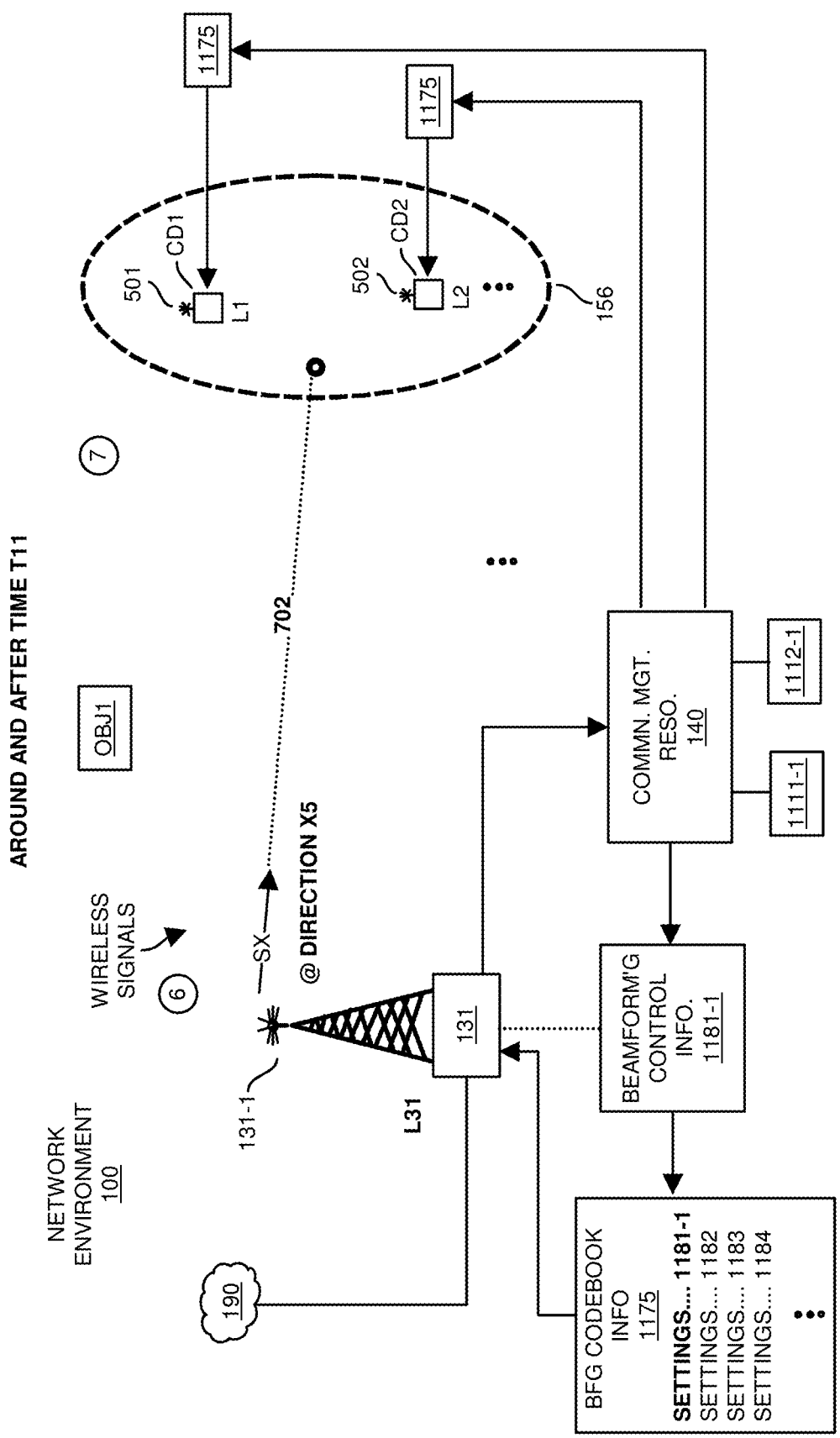
FIG. 13 is an example diagram illustrating implementation of beamforming settings to communicate between a wireless station and multiple mobile communication devices as discussed herein.

FIG. 13 is an example diagram illustrating implementation of generated beamforming settings to communicate with multiple communication devices as discussed herein.

Based upon the prior learning and generation of the corresponding beamforming control information 1181-2, when communicating with the cluster 156 of communication devices, the wireless station 131 or other suitable entity retrieves the beamforming control information 181-2 to determine the common angular direction value X5 previously stored for the cluster 156. The wireless station 131 then communicates signal SX at the common angular direction value X5 over the wireless path 702. Each of the communication devices in the cluster 156 receives a respective portion of the wireless signal SX.

Figure 14:
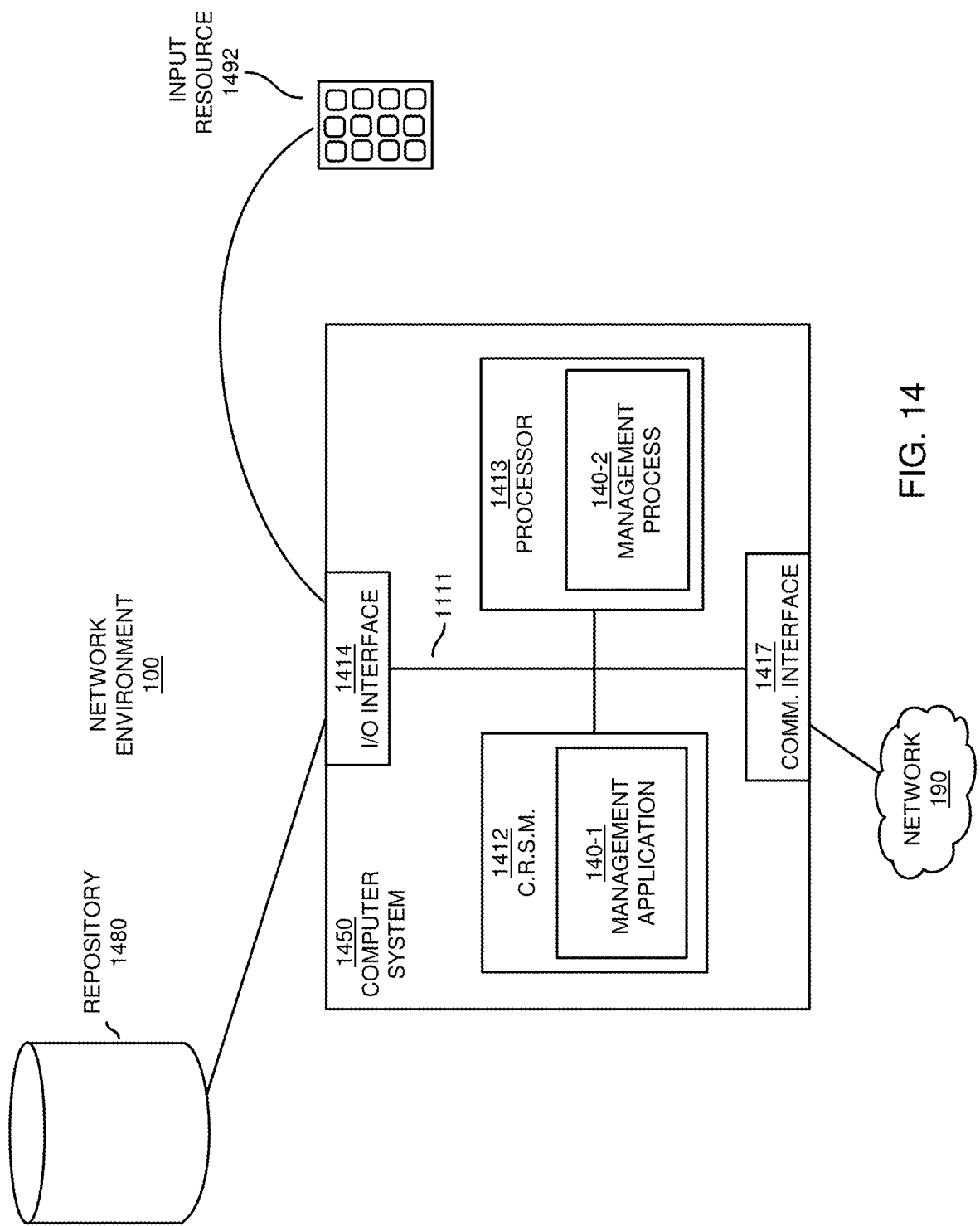
FIG. 14 is an example diagram illustrating example computer architecture operable to execute one or more operations according to embodiments herein.

FIG. 14 is an example block diagram of a computer system for implementing any of the operations as discussed herein according to embodiments herein.

Any of the resources (such as wireless station 131, communication device 121, communication device 122, communication management resource 140, function 328, function 335, function 345, function 428, function 435, function 445, etc.) as discussed herein can be configured to include a respective instantiation of computer processor hardware and corresponding executable instructions to carry out the different operations as discussed herein. For example, management application (such as wireless station 131, communication device 121, communication device 122, communication management resource 140, function 328, function 335, function 345, function 428, function 435, function 445, etc.) can be configured to execute the (communication) management application 140-1 to execute operations associated with communication management as discussed herein.

As further shown, computer system 1450 of the present example includes an interconnect 1411 that couples computer readable storage media 1412 such as a non-transitory type of media (i.e., any type of hardware storage medium) from which digital information is stored and retrieved, a processor 1413, I/O interface 1414, and a communications interface 1417.

I/O interface 1414 supports connectivity to repository 1480 and input resource 1492.

Computer readable storage medium 1412 can be any hardware storage device such as memory, optical storage, hard drive, floppy disk, etc. In one embodiment, the computer readable storage medium 1412 stores instructions and/or data.

As shown, computer readable storage media 1412 can be encoded with management application 140-1 (e.g., including instructions) to carry out any of the operations as discussed herein.

During operation of one embodiment, processor 1413 accesses computer readable storage media 1412 via the use of interconnect 1411 in order to launch, run, execute, interpret or otherwise perform the instructions in management application 140-1 stored on computer readable storage medium 1412. Execution of the management application 140-1 produces management process 140-2 to carry out any of the operations and/or processes as discussed herein.

Those skilled in the art will understand that the computer system 1450 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1450 may reside at any location or can be included in any suitable resource in any network environment to implement functionality as discussed herein.

Functionality supported by the different resources will now be discussed via flowcharts in FIGS. 15 through 17. Note that the operations in the flowcharts below can be executed in any suitable order.

Figure 15:
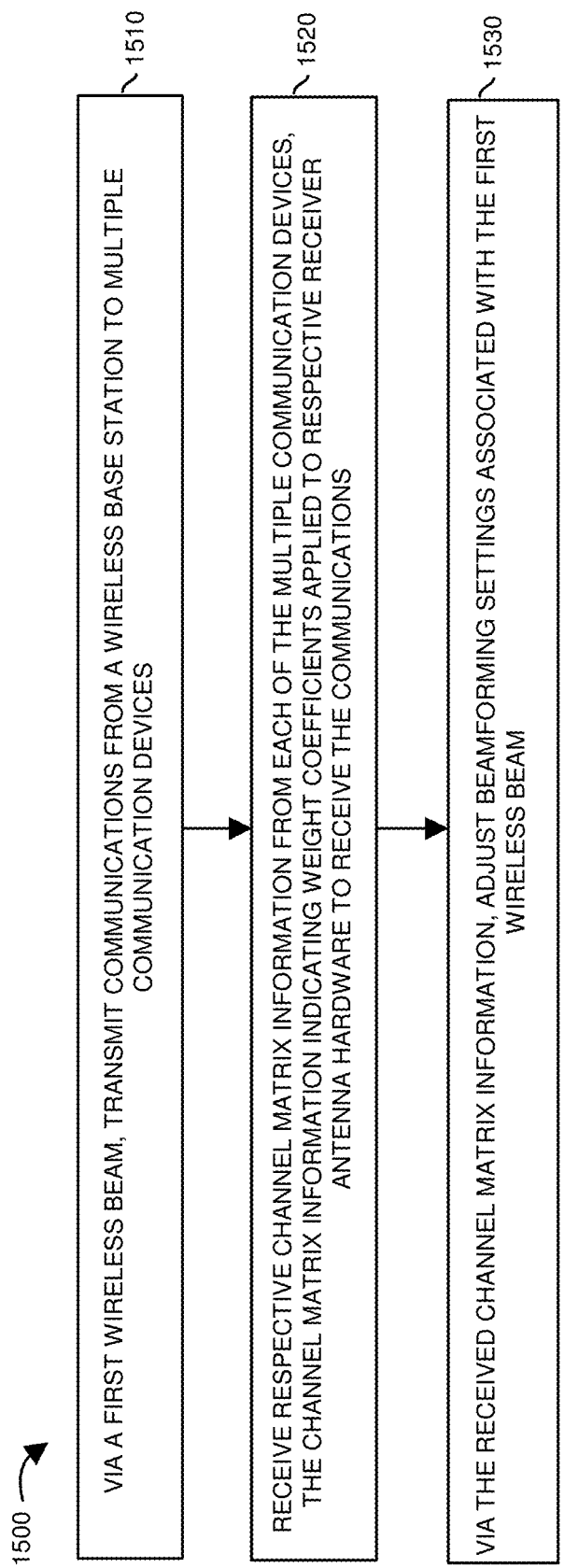
FIG. 15 is an example diagram illustrating a method according to embodiments herein.

FIG. 15 is a flowchart 1500 illustrating an example method according to embodiments. Note that there will be some overlap with respect to concepts as discussed above.

In processing operation 1510, via a first wireless beam, the wireless base station 131 transmits communications from a wireless base station to multiple communication devices.

In processing operation 1520, the wireless base station 131 receives respective channel matrix information from each of the multiple communication devices. The channel matrix information indicating weight coefficients applied to respective receiver antenna hardware to receive the communications from the wireless base station in different directions.

In processing operation 1530, via the received channel matrix information, the wireless base station 131 adjusts beamforming settings associated with the first wireless beam.

Figure 16:
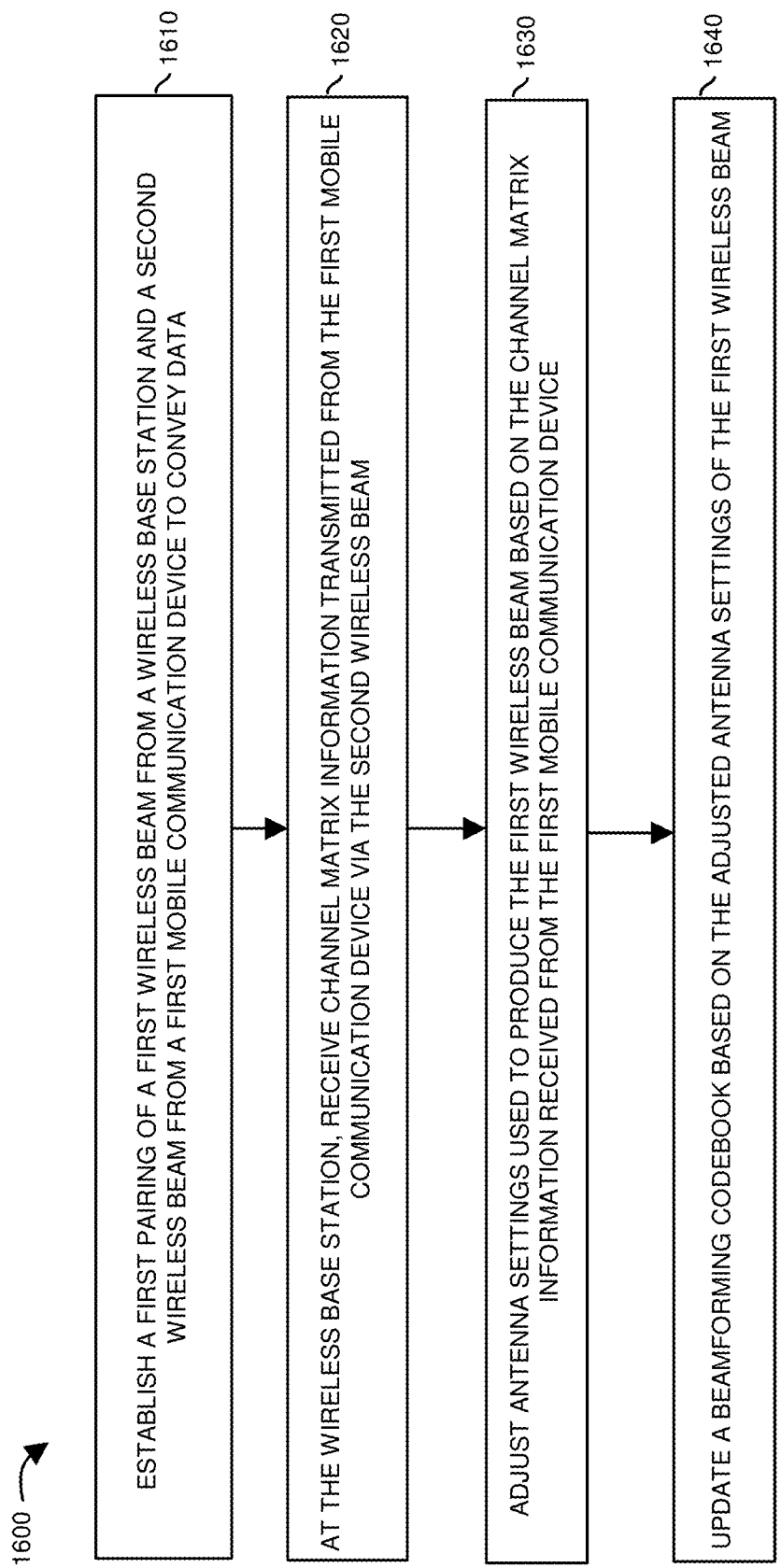
FIG. 16 is an example diagram illustrating a method according to embodiments herein.

FIG. 16 is a flowchart 1600 illustrating an example method according to embodiments. Note that there will be some overlap with respect to concepts as discussed above.

In processing operation 1610, the wireless base station 131 and the communication device establish a first pairing of a first wireless beam from a wireless base station and a second wireless beam from a first mobile communication device to set up a data communication session.

In processing operation 1620, the wireless base station, via the first wireless beam, monitors first communications transmitted from the first mobile communication device via the second wireless beam.

In processing operation 1630, the wireless base station adjusts antenna settings used to produce the first wireless beam based on the monitored first communications from the first mobile communication device.

In processing operation 1640, the wireless base station updates a beamforming codebook based on CSI (Channel State Information) feedback pertaining to the communication device CD1 as well as each of the other second wireless beams received (over some recent past) from a plurality of UEs covered by the wireless base station (gNB).

Figure 17:
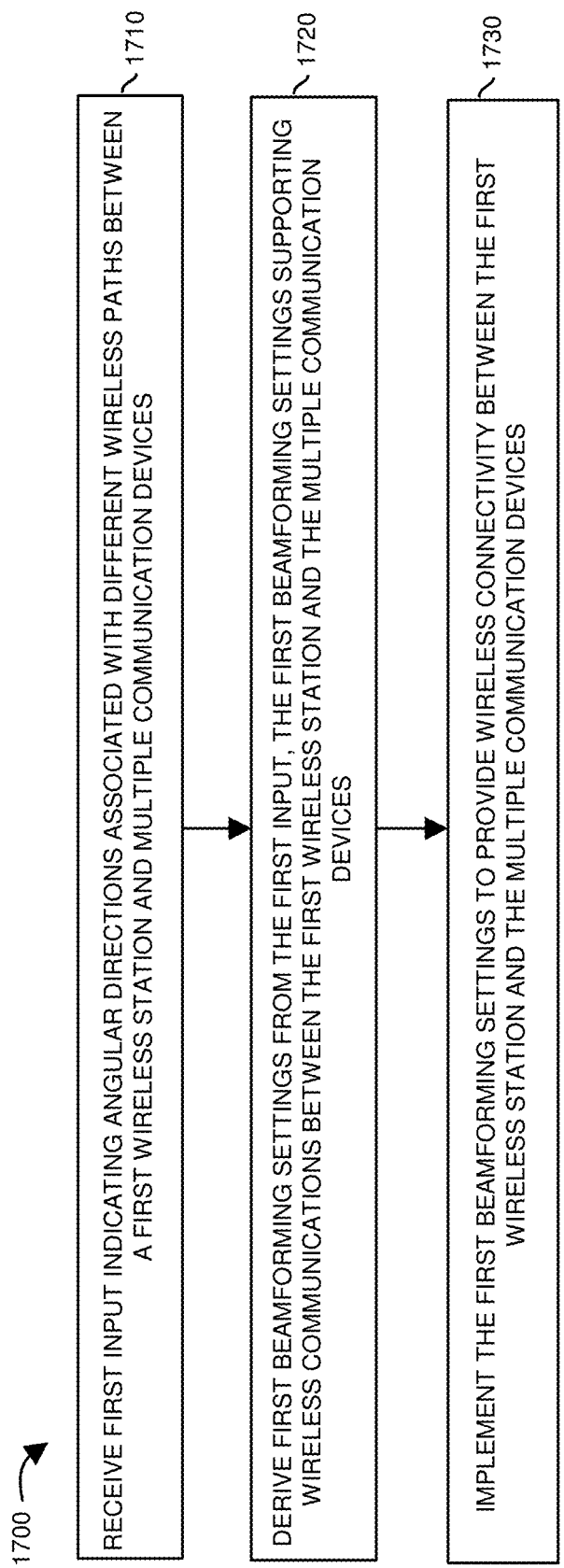
FIG. 17 is an example diagram illustrating a method according to embodiments herein.

FIG. 17 is a flowchart 1700 illustrating an example method according to embodiments. Note that there will be some overlap with respect to concepts as discussed above.

In processing operation 1710, the communication management resource 140 receives first input indicating angular directions associated with different wireless paths between a first wireless station and multiple communication devices.

In processing operation 1720, the communication management resource 140 derives first beamforming settings from the first input, the first beamforming settings supporting wireless communications between the first wireless station and the multiple communication devices.

In processing operation 1730, the communication management resource 140 implements the first beamforming settings to provide wireless connectivity between the first wireless station and the multiple communication devices.

Note again that techniques herein are well suited to support more robust and efficient communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   receiving first input associated with different wireless paths between a first wireless station and multiple communication devices;
   deriving first beamforming settings from the first input, the first beamforming settings defining a first angular beam direction of a first wireless beam configured to support wireless communications between the first wireless station and the multiple communication devices;
   implementing the first beamforming settings to provide wireless connectivity between the first wireless station and the multiple communication devices via transmission of the first wireless beam in the first bean angular direction;
   wherein a first portion of the first input indicates first angular directions of a first communication device of the multiple communication devices receiving wireless signals transmitted from the first wireless station over the different wireless paths; and
   wherein a second portion of the first input indicates second angular directions of a second communication device of the multiple communication devices receiving the wireless signals transmitted from the first wireless station over the different wireless paths.

2. The method as in claim 1, wherein the first input is feedback received from the multiple communication devices monitoring reception of the wireless signals transmitted from the first wireless station over the different wireless paths, the first angular directions and the second angular directions indicating different angles of the multiple communication devices receiving the wireless signals.

3. The method as in claim 1, wherein the first input is channel matrix information indicating weight coefficients applied to respective antenna elements in receiver antenna hardware of the multiple communication devices to receive the wireless signals transmitted from the first wireless station over the different wireless paths.

4. The method as in claim 1 further comprising:
producing a beamforming codebook to include the first beamforming settings; and
communicating the beamforming codebook including the first beamforming settings to the multiple communication devices.

5. The method as in claim 1, wherein receiving the first input includes:
receiving first channel matrix information associated with a first portion of the different wireless paths between the first wireless station and the first communication device of the multiple communication devices; and
receiving second channel matrix information associated with a second portion of the different wireless paths between the first wireless station and the second communication device of the multiple communication devices.

6. A method comprising:
receiving first input indicating angular directions associated with different wireless paths between a first wireless station and multiple communication devices;
wherein the received first input includes: i) first channel matrix information associated with a first portion of the different wireless paths, the first portion of the different wireless paths extending between the first wireless station and a first communication device of the multiple communication devices, and
ii) second channel matrix information associated with a second portion of the different wireless paths, the second portion of the different wireless paths extending between the first wireless station and a second communication device of the multiple communication devices;
deriving first beamforming settings from the first input, the first beamforming settings configured to support wireless communications between the first wireless station and the multiple communication devices; and
wherein deriving the first beamforming settings includes:
from the first channel matrix information, deriving a first wireless beam angle supporting first wireless connectivity between the first wireless station and the first communication device;
from the second channel matrix information, deriving a second wireless beam angle supporting second wireless connectivity between the first wireless station and the second communication device;
deriving a third wireless beam angle based on the first wireless beam angle and the second wireless beam angle;
producing the first beamforming settings to include the third wireless beam angle, the method further comprising:

implementing the third wireless beam angle in the first beamforming settings to provide wireless connectivity between the first wireless station and the multiple communication devices.

7. The method as in claim 6, wherein implementing the third wireless beam angle includes:
transmitting first wireless signals at the third wireless beam angle from the first wireless station to communicate with the first communication device and the second communication device.

8. The method as in claim 1 further comprising:
establishing pairings of the first wireless station with each of the multiple communication devices;
during a beamforming sweep test, transmitting the wireless signals over the different wireless paths from the first wireless station; and
receiving the first input as feedback from the multiple communication devices, the feedback including wireless power level values indicating power levels at which the multiple communication devices receive the wireless signals.

9. A method comprising:
receiving first input indicating angular directions associated with different wireless paths between a first wireless station and multiple communication devices;
deriving first beamforming settings from the first input, the first beamforming settings supporting wireless communications between the first wireless station and the multiple communication devices;
wherein deriving the first beamforming settings includes:
deriving a first wireless beam angle based on a first communication device receiving wireless signals from the first wireless station over a first portion of the different wireless paths;
deriving a second wireless beam angle based on a second communication device receiving the wireless signals from the first wireless station over a second portion of the different wireless paths; and
via quantizing, deriving a third wireless beam angle based on the first wireless beam angle and the second wireless beam angle, the method further comprising:
implementing the first beamforming settings to provide wireless connectivity between the first wireless station and the multiple communication devices.

10. The method as in claim 1, wherein deriving the first beamforming settings from the first input includes:
adjusting phase settings associated with the first beamforming settings, the adjusted phase settings assigned to control phases of antenna elements in a multi-dimensional array disposed in the first wireless station.

11. The method as in claim 1 further comprising:
in response to communicating the wireless signals from the first wireless station: i) receiving first channel matrix information from the first communication device of the multiple communication devices, the first channel matrix information indicating angular antenna settings of the first mobile communication device receiving the wireless signals during channel estimation by the first communication device, and ii) receiving second channel matrix information from the second communication device of the multiple communication devices, the second channel matrix information indicating angular antenna settings of the second communication device receiving the wireless signals during channel estimation by the second communication device.

12. The method as in claim 1, wherein implementing the first beamforming settings includes:
communicating the first beamforming settings in a beamforming codebook to the multiple communication devices, the first beamforming settings implemented by the multiple communication devices to receive subsequent wireless signals transmitted from the first wireless station.

13. A system comprising:
communication management hardware operative to:
receive first input indicating angular directions associated with different wireless paths between a first wireless station and multiple communication devices;
derive first beamforming settings from the first input, the first beamforming settings defining a first angular beam direction of a first wireless beam configured to support wireless communications between the first wireless station and the multiple communication devices; and
implement the first beamforming settings to provide wireless connectivity between the first wireless station and the multiple communication devices via transmission of the first wireless beam in the first angular beam direction;
wherein the communication management hardware is further operative to:
derive a first wireless beam angle based on a first communication device receiving wireless signals from the first wireless station over a first portion of the different wireless paths;
derive a second wireless beam angle based on a second communication device receiving the wireless signals from the first wireless station over a second portion of the different wireless paths; and
via quantizing, derive a third beam angle based on the first wireless beam angle and the second wireless beam angle.

14. The system as in claim 13, wherein the first input is feedback received from the multiple communication devices monitoring reception of first wireless signals transmitted from the first wireless station, the angular directions indicating different angles of the communication devices receiving the first wireless signals.

15. The system as in claim 13, wherein the first input is channel matrix information indicating weight coefficients applied to respective antenna elements in receiver antenna hardware of the multiple communication devices.

16. The system as in claim 13, wherein the communication management hardware is further operative to:
receive first channel matrix information associated with the first portion of the different wireless paths between the first wireless station and the first communication device of the multiple communication devices; and
receive second channel matrix information associated with the second portion of the different wireless paths between the first wireless station and the second communication device of the multiple communication devices.

17. The system as in claim 16, wherein the communication management hardware is further operative to:
from the first channel matrix information, derive the first wireless beam angle supporting first wireless connectivity between the first wireless station and the first communication device;
from the second channel matrix information, derive a second wireless beam angle supporting second wireless connectivity between the first wireless station and the second communication device; and
produce the first beamforming settings to include the third beam angle.

18. The system as in claim 17, wherein the communication management hardware is further operative to:
in accordance with the first beamforming settings, transmit first wireless signals at the third wireless beam angle from the first wireless station to communicate with the first communication device and the second communication device.

19. The system as in claim 13, wherein the communication management hardware is further operative to:
establish pairings of the first wireless station with each of the multiple communication devices;
during a beamforming sweep test, transmit first wireless signals over the different wireless paths from the first wireless station; and
receive the first input as feedback from the multiple communication devices, the feedback including wireless power level values indicating power levels at which the multiple communication devices receive the first wireless signals.

20. A method comprising:
receiving first input indicating angular directions associated with different wireless paths between a first wireless station and multiple communication devices;
deriving first beamforming settings from the first input, the first beamforming settings defining a first angular beam direction of a first wireless beam configured to support wireless communications between the first wireless station and the multiple communication devices;
implementing the first beamforming settings to provide wireless connectivity between the first wireless station and the multiple communication devices via transmission of the first wireless beam in the first angular beam direction;
wherein the multiple communication devices include a first communication device and a second communication device;
wherein the angular directions as indicated by the first input include: i) a first angle associated with the first communication device receiving a first wireless signal transmitted from the first wireless station over a first wireless path of the different wireless paths, ii) a second angle associated with the first communication device receiving a second wireless signal transmitted from the first wireless station over a second wireless path of the different wireless paths, iii) a third angle associated with the second communication device receiving the first wireless signal transmitted from the first wireless station over the first wireless path of the different wireless paths, and iv) a fourth angle associated with the second communication device receiving the second wireless signal transmitted from the first wireless station over the second wireless path of the different wireless paths.

21. The method as in claim 20, wherein deriving the first beamforming settings includes:
based on the first angle and the second angle, producing first angle information indicating a first angular value associated with the first communication device; and
based on the third angle and the fourth angle, producing second angle information indicating a second angular value associated with the second communication device.

22. The method as in claim 21 further comprising:
deriving the first angular beam direction based on a combination of the first angular value and the second angular value.

23. The method as in claim 22, wherein the first angular value and the second angular value fall within wireless coverage provided by the first wireless beam transmitted in the first angular beam direction.

24. The method as in claim 22, wherein the first angular beam direction falls between the first angular value and the second angular value.

25. The method as in claim 22, wherein the first angular beam direction is different than both the first angular value and the second angular value.

26. The method as in claim 1 further comprising:
producing first angle information based on the first angular directions; and
producing second angle information based on the second angular directions.

27. The method as in claim 26 further comprising:
deriving the first angular beam direction of the first wireless beam based on the first angle information and the second angle information.

28. A method comprising:
receiving first input indicating angular directions associated with different wireless paths between a first wireless station and multiple communication devices;
deriving first beamforming settings from the first input, the first beamforming settings defining a first angular beam direction of a first wireless beam configured to support wireless communications between the first wireless station and the multiple communication devices;
implementing the first beamforming settings to provide wireless connectivity between the first wireless station and the multiple communication devices via transmission of the first wireless beam in the first angular beam direction;
wherein the multiple communication devices include a first communication device and a second communication device;
wherein the angular directions as indicated by the first input include: i) a first angle associated with the first wireless station receiving a first wireless signal transmitted from the first communication device over a first wireless path of the different wireless paths, ii) a second angle associated with the first wireless station receiving a second wireless signal transmitted from the first communication device over a second wireless path of the different wireless paths, the second wireless signal transmitted from the first communication device at a different angle than the first wireless signal, iii) a third angle associated with the first wireless station receiving a third wireless signal transmitted from the second communication device over a third wireless path of the different wireless paths, iv) a fourth angle associated with the first wireless station receiving a fourth wireless signal transmitted from the second communication device over a fourth wireless path of the different wireless paths, the fourth wireless signal transmitted from the second communication device at a different angle than the third wireless signal.

29. The method as in claim 28, wherein deriving the first beamforming settings includes:
based on the first angle and the second angle, producing first angle information indicating a first angular value; and
based on the third angle and the fourth angle, producing second angle information indicating a second angular value.

30. The method as in claim 29 further comprising:
deriving the first angular beam direction based on a combination of the first angular value and the second angular value.

\* \* \* \* \*